United States Patent [19]

Kobayashi et al.

[11] Patent Number: 5,270,827
[45] Date of Patent: Dec. 14, 1993

[54] OPTICAL RECORDING SYSTEM FOR CONTROLLING RECORDING LIGHT QUANTITY BASED ON PIXEL PATTERNS IN AN IMAGE

[75] Inventors: Shinya Kobayashi, Mito; Akira Shimada, Hitachi; Akiyoshi Hakoyama, Hitachi; Akira Sasaki, Hitachi, all of Japan

[73] Assignee: Hitachi, Ltd., Tokyo, Japan

[21] Appl. No.: 495,903

[22] Filed: Mar. 20, 1990

[30] Foreign Application Priority Data

Mar. 20, 1989 [JP] Japan .................. 1-066223

[51] Int. Cl.$^5$ .......................... H04N 1/40; H04N 1/21; G01D 15/14
[52] U.S. Cl. .................... 358/298; 358/455; 358/459; 346/160
[58] Field of Search ............... 346/108, 160; 358/296, 358/298, 300, 455, 459, 462; 395/51, 919, 920, 921

[56] References Cited

U.S. PATENT DOCUMENTS

| | | | |
|---|---|---|---|
| 4,396,928 | 8/1983 | Abe et al. ................ | 346/160 |
| 4,544,264 | 10/1985 | Bassetti et al. . | |
| 4,547,811 | 10/1985 | Ochi et al. ................ | 358/455 |
| 4,680,645 | 7/1987 | Dispoto et al. ............ | 358/459 X |
| 4,680,646 | 7/1987 | Ikeda et al. ............... | 358/298 |
| 4,681,424 | 7/1987 | Kantor et al. ............. | 358/296 X |
| 4,727,430 | 2/1988 | Miwa ......................... | 358/459 |
| 4,809,063 | 2/1989 | Moriguchi et al. ........ | 358/298 X |
| 4,847,641 | 7/1989 | Tung .......................... | 346/160 X |
| 4,878,068 | 10/1989 | Suzuki . | |
| 4,977,603 | 12/1990 | Irie et al. ................... | 358/462 X |
| 4,989,039 | 1/1991 | Hayashi et al. ........... | 346/160 X |
| 5,055,943 | 10/1991 | Kishida ...................... | 358/459 |

FOREIGN PATENT DOCUMENTS

| | | |
|---|---|---|
| 0246457 | 11/1987 | European Pat. Off. . |
| 3729936 | 3/1988 | Fed. Rep. of Germany . |
| 57-60355 | 4/1982 | Japan . |
| 57-204546 | 12/1982 | Japan . |
| 62-26621 | 6/1987 | Japan . |
| 63-296069 | 12/1988 | Japan . |
| 1-163068 | 6/1989 | Japan . |

OTHER PUBLICATIONS

Anne Miller, "Expert Systems", 1986, pp. 12–15.
Al Biles et al., "Using Expert Systems in Typographic Design", Jun. 1987, *IEEE Transactions on Professional Communication*, vol. PC 30, No. 3, pp. 102–111.

Primary Examiner—Benjamin R. Fuller
Assistant Examiner—Eric Frahm
Attorney, Agent, or Firm—Antonelli, Terry, Stout & Kraus

[57] ABSTRACT

An optical recording system is disclosed in which input pixels are recorded by controlling the quantity of light as a medium based on the input pixels. The information on the pixels surrounding at least given one of the input pixels is compared with predetermined pattern information, and the particular pixel is accordingly subdivided into a plurality of regions for each of which the light quantity is controlled. Specifically, an optical recording system includes a recognition device for recognizing at least one feature of the desired image by comparing pixel information constituting a predetermined pattern with other pixel information making up a recording target and at least a given one of the pixels with surrounding pixels, and a device for determining the light quantity in a predetermined manner in accordance with the feature. The system further includes a light quantity control device including an exposure pattern signal storage having stored therein a set of rules for controlling the light quantity of a given one of the input pixels in accordance with the information on the surrounding pixels.

20 Claims, 26 Drawing Sheets

FIG. 5
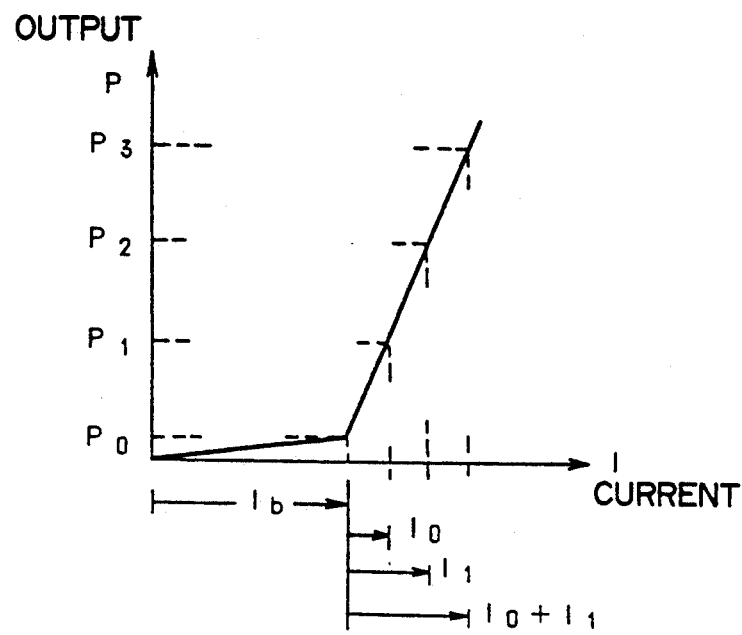
FIG. 8A    FIG. 8B
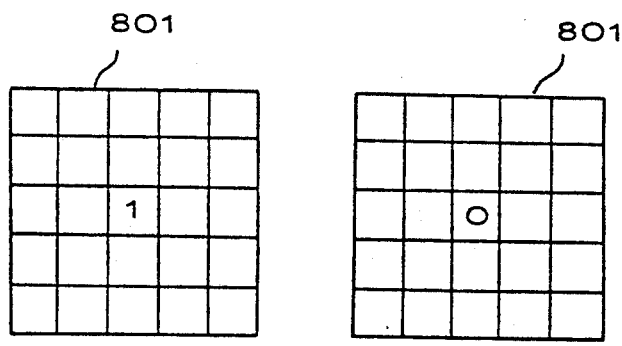
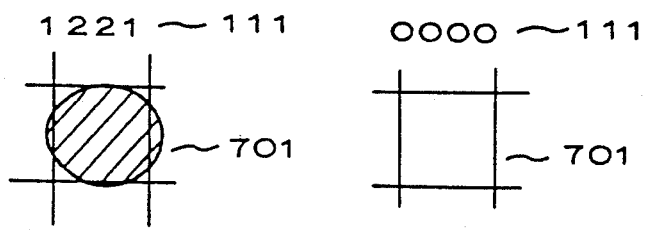

3333

2222

3300

1111

3000

FIG. 17A
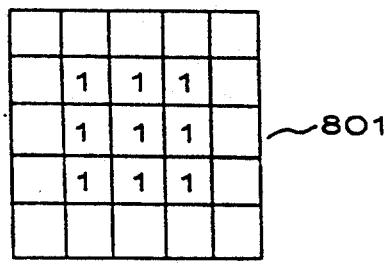
FIG. 17B
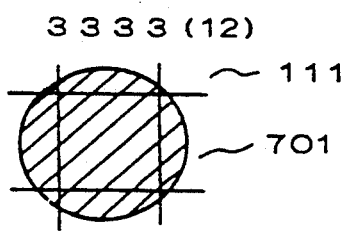
FIG. 18A  FIG. 18B
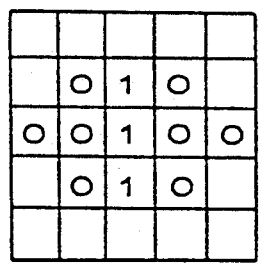 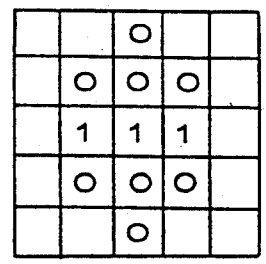
FIG. 18C  FIG. 18D
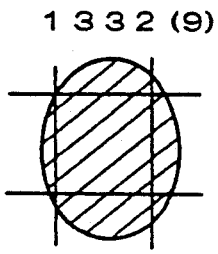 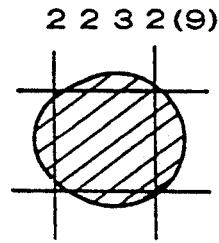

FIG. 19A
(EXCEPTING FIG. 18A)
FIG. 19B
(EXCEPTING FIG. 18B)
FIG. 19C  1 2 3 1 (7)
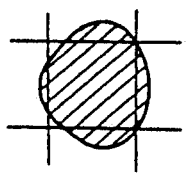
FIG. 19D  1 2 2 2 (7)
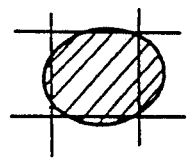
FIG. 20A
FIG. 20B
FIG. 20C  0 2 2 0 (4)
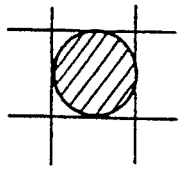
FIG. 20D  0 2 2 0 (4)
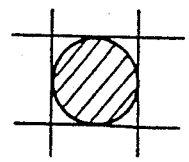

FIG. 21A
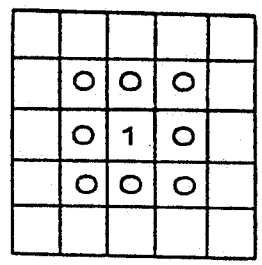
FIG. 21B
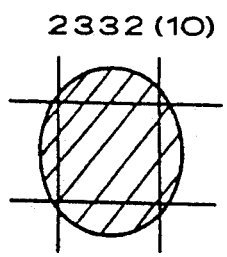
2332 (10)
FIG. 22A      FIG. 22B
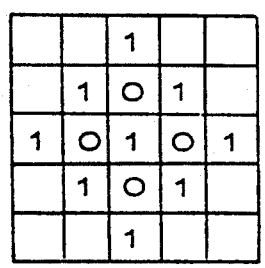 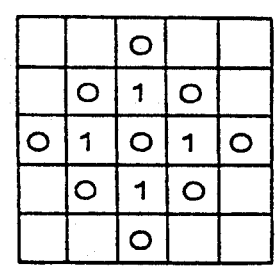
FIG. 22C      FIG. 22D
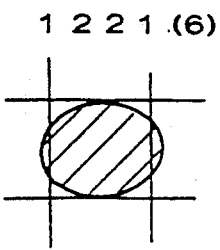 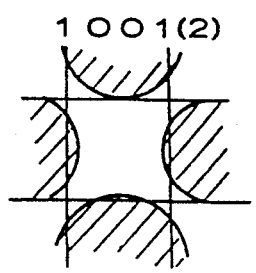
1 2 2 1 (6)     1 0 0 1 (2)

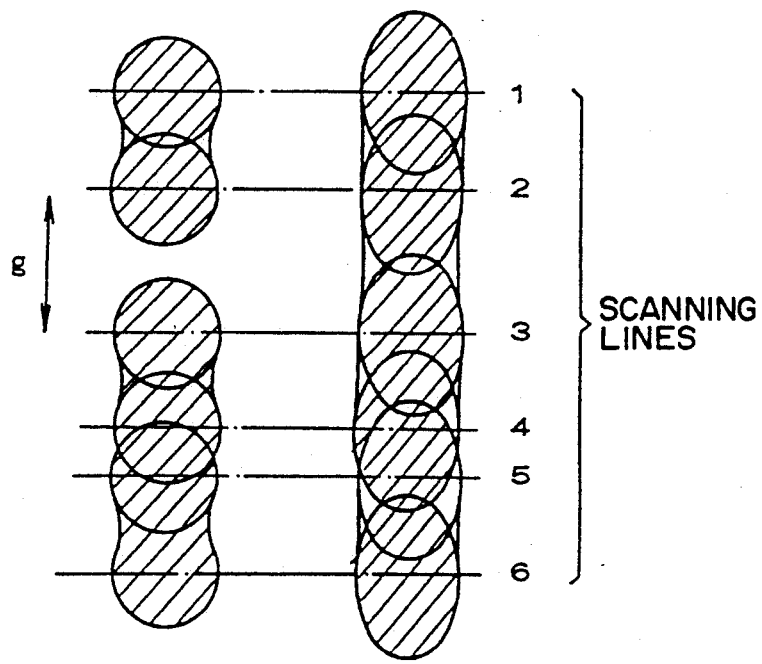

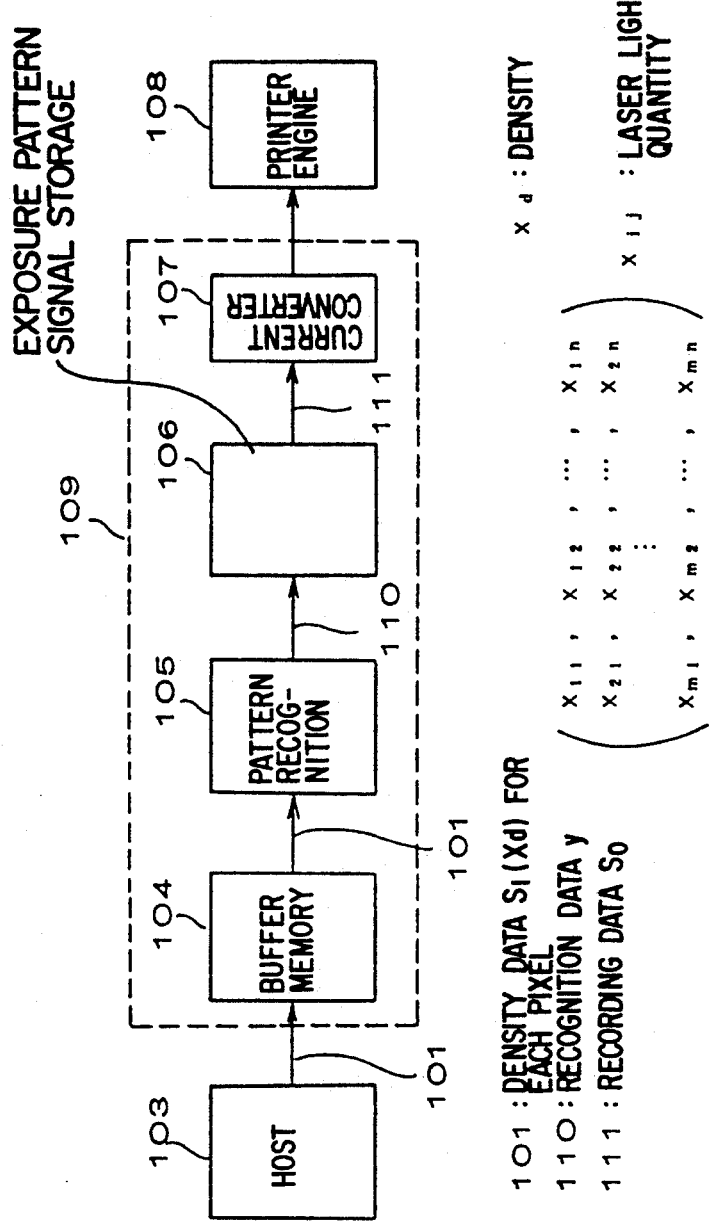

| USER DATA | | RECOGNITION DATA | | | | | | | | | |
|---|---|---|---|---|---|---|---|---|---|---|---|
| | | FEATURE IDENTIFIER | | | | | | | | | |
| IMAGE DENSITY | | 1 | 2 | 3 | 4 | 5 | 6 | 7 | 8 | 9 | 10 |
| | 3 | 3333 | 2332 | 2332 | 1332 | 2232 | 0330 | 3332 | 1331 | 2001 | 1332 |
| | 2 | 3332 | 1332 | 2232 | 0331 | 1222 | 0220 | 2332 | 1221 | 1001 | 1221 |
| | 1 | 3330 | 0331 | 1222 | 0330 | 1221 | 0210 | 1231 | 0221 | 0000 | 0221 |
| | 0 | 3320 | 0230 | 1121 | 0220 | 1111 | 0110 | 1220 | 0120 | 0000 | 0220 |

FIG. 33B  IDENTIFIER

1 : SOLID IMAGE
2 : LONGITUDINAL STRAIGHT LINE
3 : LATERAL STRAIGHT LINE
4 : LONGITUDINAL PAIR LINES
5 : LATERAL PAIR LINES
6 : INTERSECTION
7 : ISOLATED POINT
8 : BLACK DOT
9 : WHITE DOT
10 : OTHERS

OPTICAL RECORDING SYSTEM FOR CONTROLLING RECORDING LIGHT QUANTITY BASED ON PIXEL PATTERNS IN AN IMAGE

BACKGROUND OF THE INVENTION

The present invention relates to an optical recording system for recording an image with light, or more in particular to a system and a method for controlling the quantity of light.

In recording an image including characters, a figure or even a natural scene like a photograph by a digital recording system, the first step is to sample and quantize the particular image. An image input unit of an image scanner or the like forms a plurality of meshes numbering, say, 16 per millimeter in each of x and y directions on an image. The point making up each mesh is called a pixel and is used as a minimum spatial unit. The term "spatial" is associated with a two-dimensional expansion along the x and y directions. The image input unit generates pixel data representing the image density in a pixel (Sampling). This pixel data, which normally assumes an analog value, is converted into a digital value like an eight-bit binary data by A/D conversion means (Quantization). An optical recording system for recording such an image made up of image data is configured, for example, as shown in FIGS. 25 and 26.

A configuration of a machine unit (engine) generally used with an optical recording system is shown in FIG. 25. The recording mainly requires the following processes:

| | |
|---|---|
| (1) Charging: | To charge a light-sensitive material uniformly |
| (2) Exposure: | To expose to light to form an electrostatic latent image |
| (3) Development: | To cause the latent image to adsorb a developer to make a visible image |
| (4) Transfer: | To transfer the adsorbed developer to the recording paper |
| (5) Fixing: | To fuse and fix the developer on the recording paper (that is, a recording medium) |
| (6) Erasure: | To remove the static electricity remaining on the light-sensitive material |
| (7) Cleaning: | To clean off the developer from the light-sensitive material |

FIG. 26 shows only the exposure of all the processes shown in FIG. 25. This process is operated generally in the manner described below.

A modulation circuit 55 converts image data (printing information) into an electrical signal and produces a modulated electrical signal, which signal is used to drive a laser beam source 54 thereby to produce a laser beam 51. The laser beam 51 scans while being irradiated on a light-sensitive material drum 50 through a mirror 52 rotated by a motor 53. In this optical recording system, attention is paid only to the pixel data to be recorded Specifically, this data is appropriately corrected and the exposure amount on the light sensitive material is modulated for recording purposes on the basis of the pixel data thus corrected. The recording of the same pixel data, however, is known to require different methods of correction or modulation for recording a high-quality image depending on what kind of image the particular pixel data belongs to in the whole picture. In the case of reversal development for monochromatic binary recording using a laser printer to record the exposed surface portion of the light-sensitive material in black color and the unexposed portion thereof in white color, for example, the black pixels for recording a large black area (hereinafter called "the solid image") and those of other lines or characters must be processed in different ways if a high-quality recording is to be achieved. Let us apply this idea to the laser printer using the reversal phenomenon in a system disclosed by JP-A-62-26621. In the case where the pixels above and below the black pixels to be recorded (hereinafter called "the recording black pixels") are black, the surface of the light-sensitive material corresponding to the recording black pixels is exposed with greater intensity in recognition of the fact that the recording black pixels are those included in a solid image. This increases the diameter of the recording dots corresponding to the size of the recording per beyond a prescribed value and therefore white portions in the solid image caused by irregular intervals of beam scannings are removed, thereby making it possible to record a high-quality solid image. In the case where the pixels above or below the black pixels to be recorded are white, on the other hand, the black pixels to be recorded are recognized to be those within lines or characters, and thus are exposed less intensely so that the diameter of the recording dots is identical to a prescribed size. In this way, the quantity of the laser light emitted is controlled for each pixel to improve the quality of the solid image portion without adversely affecting the image quality of lines or characters, resulting in a high-quality recording of the particular image as a whole.

A host system including a work station or a word processor produces and applies toward a recording system pixel data generally sampled and quantized by a standard method. This quantized pixel data takes such a form as a language including a postscript or a command standardized according to JIS or the like or data compressed by an MH method or the like. In any case, this data is restored to the normal pixel data (raw data). An attempt to use such an image data in direct form, however, would fail to utilize the full performance of a recording system as the recording characteristics vary from one recording system to another and the result would be an unsatisfactory utilization of the functions or a recording failure of the particular recording system. The recording characteristics of a light recording system such as the laser printer or the LED printer include, for example:

(1) The light quantity is controlled continuously in either a main or a subsidiary scanning direction, but discretely with a predetermined density in the other direction for the purpose of recording.

(2) The diameter of the recording dot by the laser beam light varies with the amount of exposure from the light source to the light-sensitive material (which amount may hereinafter be called "the exposure pattern" or if expressed by an electrical signal, "the light pattern signal").

As a result, unless the standard image data from the host system is corrected and modulated taking these characteristics into consideration before recording, it is impossible for the optical recording system to display its maximum performance. The aforementioned related art system, which is intended to record the solid image portion in a stable manner by taking advantage of the characteristic (2) above, fails to pay due attention to straight lines having a given inclination or intersections, fine stripes or checkers, or screen dots included in a half-tone image or the like.

Also, the aforementioned system fails to utilize the other characteristic (1), and thus the performance of the optical recording system is not fully exhibited.

SUMMARY OF THE INVENTION

The object of the present invention is to provide a light-quantity control device which has been developed for solving the above-mentioned problems and to realize a versatile optical recording system adapted to meet (1) an increased variety of demands for image quality, and (2) the sophistication of the technique for compensating for the laser printer characteristics, by taking advantage of the characteristics of an optical recording system.

In order to achieve the aforementioned object, there is provided according to the present invention an optical recording system for forming a plurality of pixels spatially sampled from an image and controlling the light quantity through the light on the basis of the pixels for the purpose of recording, comprising recognition means for comparing pixel data made up of a predetermined pattern with at least a given pixel and the surrounding pixels to recognize at least one of the characteristics of the image, and light quantity-determining means for determining a predetermined light quantity dependent on the characteristic recognized.

Referring to FIG. 1, input pixel data 101 from a host system 103 is sent to a buffer memory 104 in a light quantity control device 109 according to the present invention in the order of recording in a printer engine 108. The buffer memory 104 has stored therein pixel data corresponding to the pixels to be recorded (hereinafter called "the recording pixels") and the surrounding pixel data 101 within a predetermined range and supplies the stored data collectively to the pattern recognition means 105. The pattern recognition means 105 recognizes the type of the image represented by the pixel data 101 corresponding to the recording pixels supplied from the buffer memory 104. The result of recognition is sent in the form of recognition data 110 to an exposure pattern signal storage 106. The exposure pattern signal storage 106 has stored therein an exposure pattern signal 111 for exposure on the light-sensitive material that permits the most ideal recording of the recording pixels for each recognized image (that is, each recognition data 110) as determined by computations or experiments in advance. A pattern signal 111 is selected by the recognition data 110. The pattern signal 111 thus generated is converted into a driving current of a laser diode or an LED by a current converter 107, and applied to a light source-driving circuit in the printer engine 108.

BRIEF DESCRIPTION OF THE DRAWINGS

FIG. 5 shows an input-output characteristic of a diode in the pattern recognition means according to an embodiment of the present invention.

FIGS. 8A-8D are diagrams showing a recognition pattern signal and an exposure pattern signal according to an embodiment of the present invention.

FIGS. 17A-17B are diagrams showing a processing for a solid image according to the present invention.

FIGS. 18A-18D are diagrams showing a processing for a linear image according to the present invention.

FIGS. 19A-19D are diagrams showing a processing for a straight line not isolated according to the present invention.

FIGS. 20A-20D are diagrams showing a processing for an intersection image according to the present invention.

FIGS. 21A-21B are diagrams showing a processing for a spot image isolated according to the present invention.

FIGS. 22A-22D are diagrams showing a processing for a dot image according to the present invention.

FIGS. 23A-23B are diagrams for explaining the stabilization of the line width of a longitudinal recording dot according to the present invention.

FIG. 24 shows a configuration of the system according to still another embodiment of the present invention.

FIG. 27 is a diagram showing a matrix of a recognition pattern for a hatched portion according to still another embodiment of the present invention.

FIG. 28 shows another matrix of the recognition pattern for a hatched portion according to still another embodiment of the present invention.

FIGS. 33A-33B are diagrams showing a configuration of the exposure pattern signal storage according to still another embodiment of the present invention.

DESCRIPTION OF THE PREFERRED EMBODIMENTS

Embodiment 1

Embodiments of the present invention will be described below with reference to the accompanying drawings.

Figure 1:
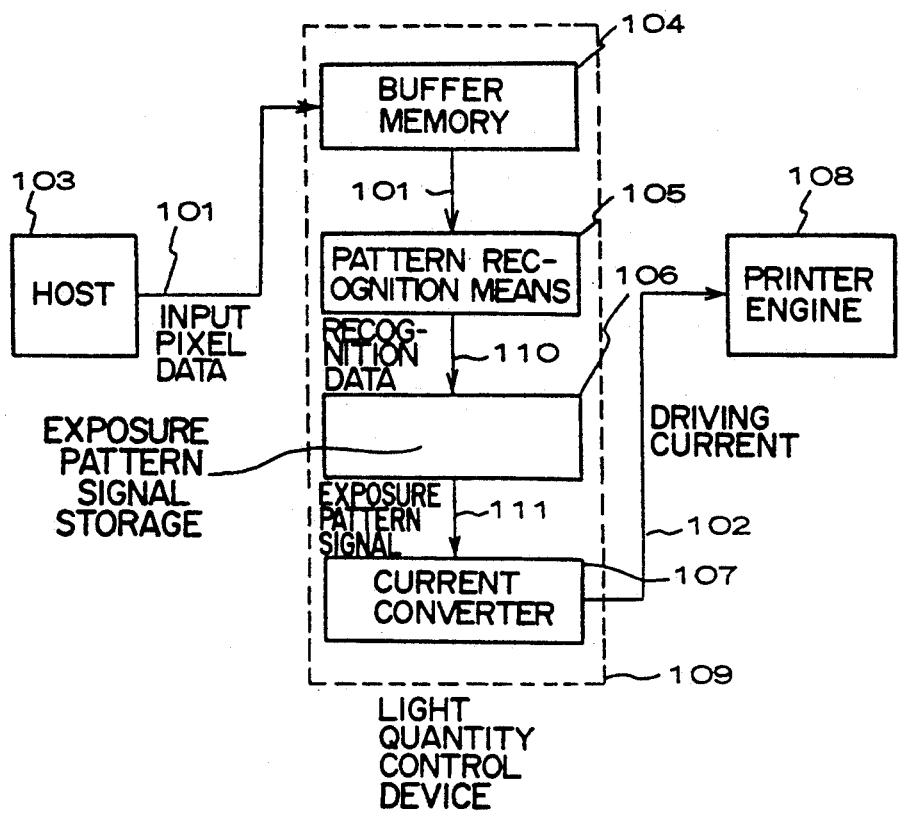
FIG. 1 is a diagram showing a configuration according to an embodiment of the present invention.

An embodiment of the present invention is shown in FIG. 1. The recording process in a printer engine 108 is similar to that for an ordinary optical recording system described above. If pixel data 101 sampled and quantized by a standard method is to be converted into a form permitting the best utilization of the features of the optical recording system for applying a driving current 102 finally to a light source driving circuit in the printer engine 108, it is first of all necessary to recognize what image is constituted by the particular recording pixels. The pattern recognition means 105 identifies the type of a given image from the part thereof recognized thereby from the pixel data 101 corresponding to the recording pixels applied from the buffer memory 104 and similar data 101 covering a predetermined surrounding range of pixels and generates recognition data 110. The greater the number of pixel data 101 referenced to, the greater in accuracy and variety of recognition. In black and white binary recording, for example, the referencing to 25 pixel data 101 permits recognition in $3 \times 10^7$ different ways. The recognition data 110, which is utterly different from the original pixel data 101 representing the image density, is sent to the exposure pattern signal storage 106 as an identifier (a number assigned as a basis of a search address) only for search. The exposure pattern signal storage 106 has stored therein a plurality of exposure pattern signals 111 (described in detail later herein) on the light-sensitive material to assure the most ideal recording of the recording pixels, and upon receipt of the recognition data 110, produces a corresponding pattern signal 111. The pattern signal 111 assumes an analog value continuously changing within the recording pixels along the continuous scanning direction (the main scanning direction for the laser printer and the sub-scanning direction for the LED printer), and an analog value discretely changing in a predetermined density along the discrete scanning direction (sub-scanning direction for the laser printer, and the main scanning direction for the LED printer). In the case where a strictly continuous change is difficult, a discrete value sampled sufficiently finely compared with the sampling density of the pixel data 101 will do. Also, a digital value having a sufficient number of levels of quantization may be used if a strict analog value is difficult to obtain. In the explanation that follows, such an analog quantity may be expressed as a continuous analog value or a continuous analog quantity or otherwise by a term associated with continuity.

The pattern signal 111 is converted into a driving current 102 for a light source-driving circuit within the printer engine 108 by the current converter 107, and becomes an amount of exposure on the light-sensitive material (energy of the light irradiated on each unit area). The printer engine 108 records an image on the basis of this exposure amount. The optical recording system having the above-mentioned characteristics is equipped with the following features due to the pattern signal 111:

(1) The exposure amount continuously changed along the main scanning direction makes possible the recording of dots at a given position in the particular direction.

(2) Generation of analog data permits the recording of a recording dot to a given size within a predetermined range.

Figure 14A:
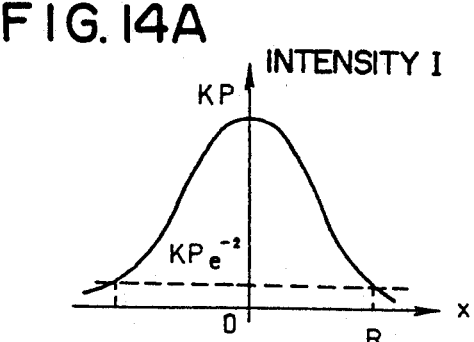
FIGS. 14A-14B show a characteristic of light sensitivity of a laser beam.
Figure 14B:
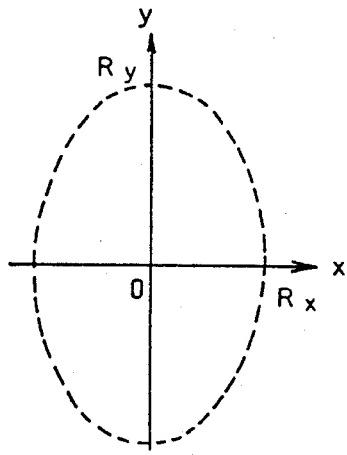
Figure 15A:
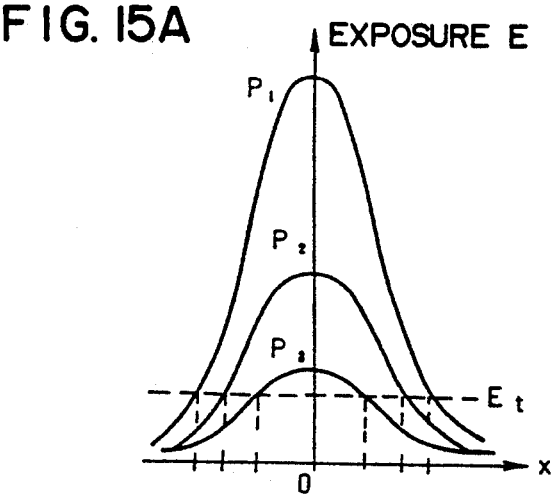
FIGS. 15A-15B are diagrams showing a characteristic of exposure distribution by the laser beam.
Figure 15B:
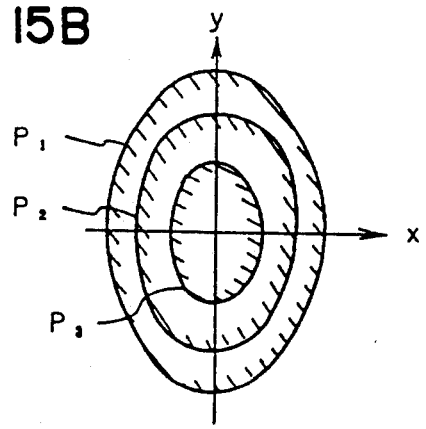

Now, this phenomenon will be dealt with by reference to the case where the printer engine 108 is a laser printer. First, the light intensity distribution of the laser beam irradiated on the light-sensitive material is shown in FIG. 14A. This light intensity distribution, which is determined by the characteristics of the optical system, is generally approximated by the Gauss distribution expressed by equation (1) below.

$$I = k \cdot P \cdot exp(-2 \cdot ((x/Rx)^2 + (y/Ry)^2)) \quad (1)$$

where P is a source output of the laser beam, and k a proportionality constant. An intensity locus of the central intensity $e^{-2}$ is shown by the dotted line in FIG. 14B. The form surrounded by this dotted line is called a laser beam spot, which in this case makes up an ellipse having a radius of Rx in x direction and Ry in the y direction. FIG. 15A shows an exposure amount distribution with this beam irradiated on the light-sensitive material for a predetermined length of time. The laser light source output P is changed from $P_1$ to $P_2$ to $P_3$. The laser printer based on the reversal development has a specific threshold level of exposure Et, so that the developer (toner) is attached at a place of an exposure level higher than the threshold. The black dots recorded in response to various outputs, therefore, have different sizes as shown in FIG. 15B.

Figure 16A:
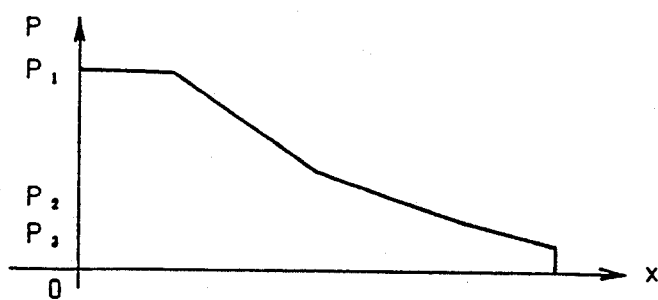
FIGS. 16A-16D are diagrams showing the laser light source output characteristic of a light quantity control device and the corresponding recording image according to the present invention.
Figure 16B:
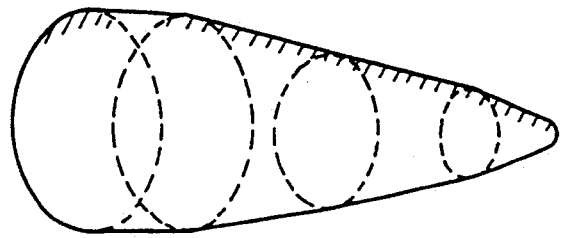
Figure 16C:
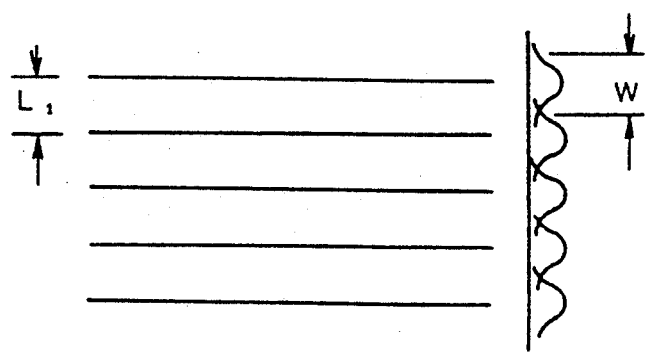
Figure 16D:
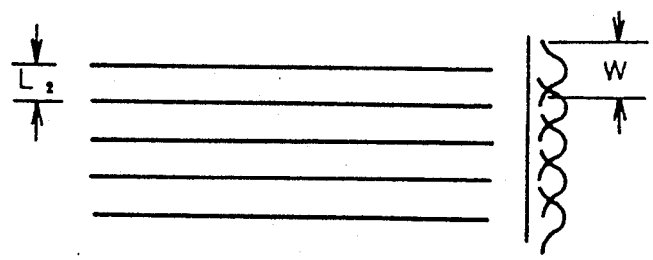
Figure 25:
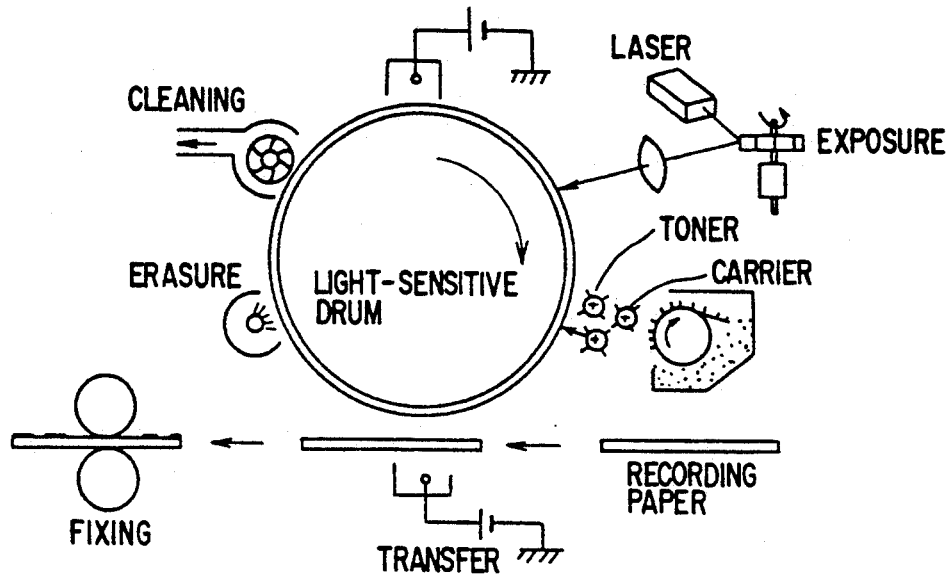
FIG. 25 shows an engine of a conventional optical recording system.
Figure 26:
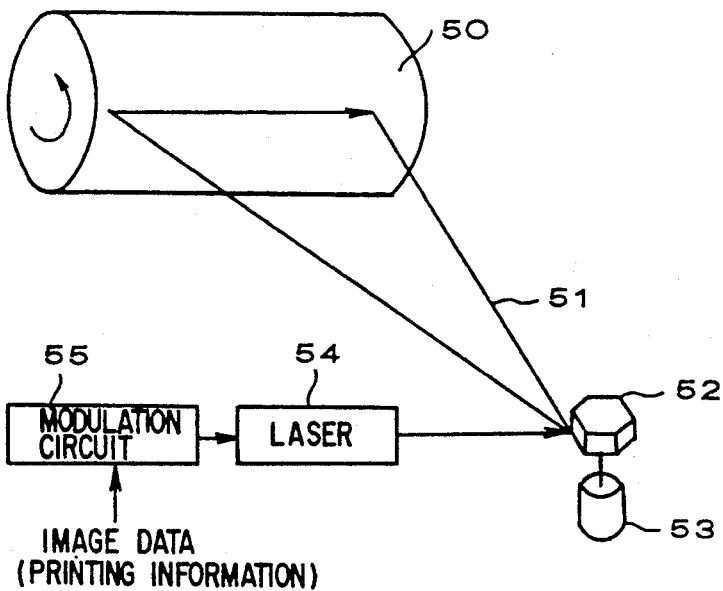
FIG. 26 is a diagram showing a configuration of an exposure process section of a conventional optical recording system.

Now, the exposure by scanning will be explained. The light quantity control means changes the laser beam source output P in a continuous analog manner along the main scanning direction. If the laser beam source output P is changed in the manner shown in FIG. 16A, the recording image assumes a wedge form as shown in FIG. 16B. This form is obtained as a result of a continuous change in the size of the recording dots. Also, an image may be recorded at a desired position without being limited by the pixel boundary along the main scanning direction. These points are new advantages not positively utilized in the conventional laser printers. Utilizing the features of optical recording in this way enables the laser printer to display the performance thereof to full. Also, the recording characteristics of a laser printer significantly depend on the normal or reversal development. They are also affected by the ratio W/L between the spot size W of the laser beam and the pitch L of the scanning lines for the same imaging process. This fact is illustrated in FIGS. 16C and 16D which show the scanning line of a laser beam having an interval L scanned on the light-sensitive drum and an exposure distribution thereof; FIG. 16C a case with a wide pitch of the scanning lines; and FIG. 16D a case with a narrow pitch of the scanning lines. In the laser beam printer normally used, the pitch of the sub-scanning lines is changeable with comparative ease, but the size of the beam spot is difficult to change. As a result, fluctuations in W or L due to external disturbances could not be compensated. An application of the present invention, in contrast, compensates for fluctuations in the recording characteristics.

Now, the manner in which a pattern signal 111 is produced from the information in the exposure pattern signal storage 106, that is, the recognition data 110 will be described. Assume that the exposure pattern signals 111 for all the recognition data 110 are stored in the exposure pattern signal storage 106 in advance. The pattern signal 111, which is temporarily applied through the recognition data 110, is not subjected to any limitation from the original pixel data 101. A pattern signal 111 may be generated anew on the basis of the recognition data 110 also in respect of the density information as well as the quantization or sampling conditions. In the case where the optical recording system is capable of recording in full color, for example, the pattern signal 111 may be generated to assure optimum recording in full color even if the original pixel data 101 has no full color information. That is to say, it is possible to compensate for the complicated recording characteristics of an optical recording system and thus to meet the sophisticated user demand for an image. Specifically, computations and recording tests are conducted against various images in advance for each recording system, the pattern signal 111 for each recognition data 110 is defined, and all these data are stored in the exposure pattern signal storage 106 beforehand. By doing so, a great variety of optical recording techniques are stored in the data base 106, thus improving the quality of a recording image to meet all the desired image quality requirements regardless of the recording characteristics of an optical recording system.

Embodiment 2

A second embodiment of the present invention will be explained below with reference to FIGS. 2 to 8 and FIGS. 17 to 23.

Figure 2:
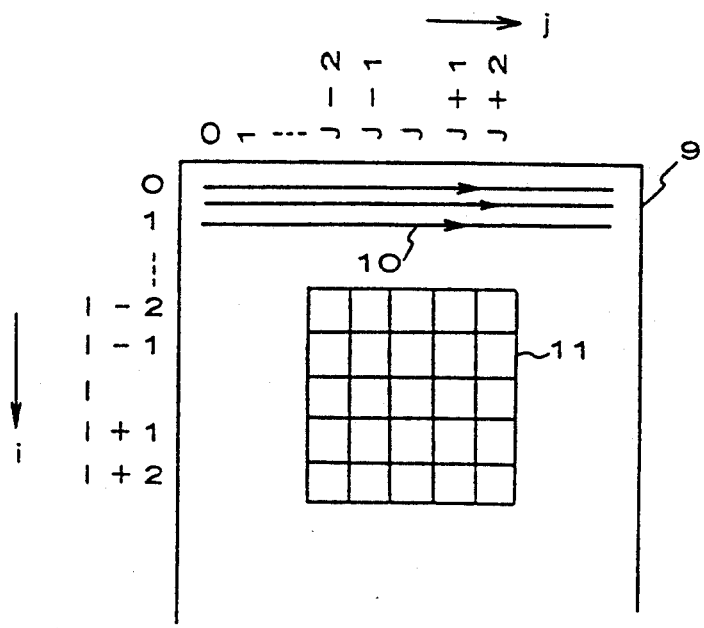
FIG. 2 is a diagram showing an input region of an input image data according to an embodiment of the present invention.
Figure 3:
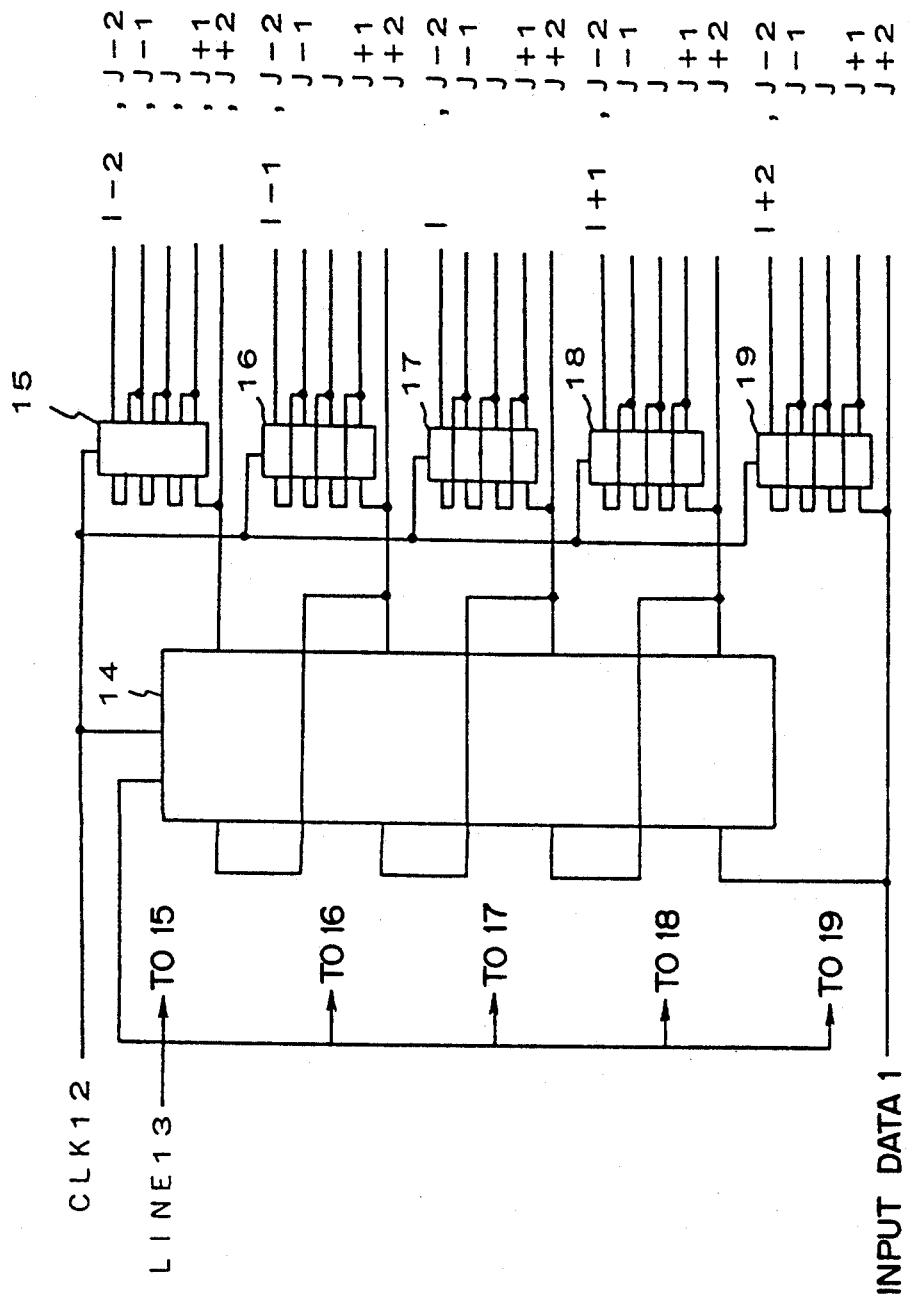
FIG. 3 is a circuit diagram of a buffer memory according to an embodiment of the present invention.
Figure 4:
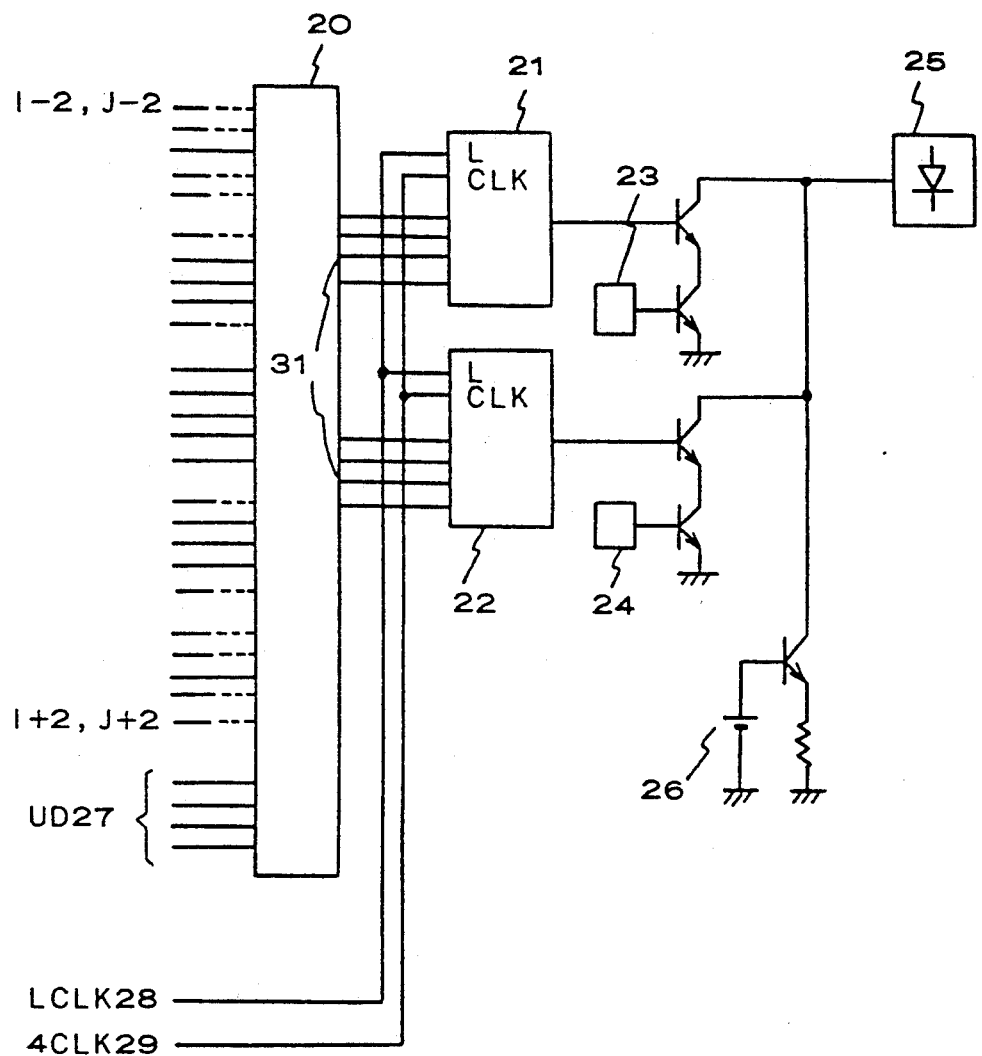
FIG. 4 is a circuit diagram of pattern recognition means according to an embodiment of the present invention.

FIG. 2 shows a region 11 of pixel data 101 of an input image 9, produced from a buffer memory 104 to pattern recognition means 105. Arrow 10 designates the sequence of input of the pixel data 101 into the buffer memory 104. By way of explanation of the present embodiment, the region 11 is assumed to have a size of five pixels each in row and column with the pixel data 101 in monochromatic binary form (1 bit). Also assume that the pixel data 101 corresponding to the present pixel (I, J) to be recorded is positioned at (I, J). As seen from FIG. 2, the pixel data 101 of $\{(I+i, J+j) i = \pm 2, \pm 1, 0, j = \pm 2, \pm 1, 0\}$ is produced for 25 pixels including the surrounding part thereof. Upon completion of the recording for a recording pixel, the position (I, J+1) of the pixel data 101 corresponding to the next recording pixel is replaced by (I, J). A circuit of the buffer memory 104 is shown in FIG. 3. First, a line sync signal LINE 13 representing the starting point of recording along the scanning direction clears an address counter of a line memory 14 for simultaneously writing and reading a data of four lines sequentially for each pixel data 101, and further clears the five data latches 15 to 19 to zero (white). Next, the pixel data 101 are sequentially applied to the line memory 14 and the latch 15 in synchronism with a pixel sync signal CLK 12. The memory 14 delays the pixel data 101 by one latch each and applies it to the latches 16, 17, 18 and 19. Each of the latches 15 to 19 holds and produces the pixel data 101 for the past four pixels along line direction. As a result, the pixel data 101 for 25 pixels shown in FIG. 2 are collectively obtained. FIG. 4 shows the pattern recognition means 105, the exposure pattern signal storage 106 and the current converter 107. The pixel data 101 for the 25 pixels from the memory 104 are applied as an address of a 32-M word memory 20. When it is desired to reduce the memory capacity at the sacrifice of some recognition ability, a total of only 13 address lines may be used while eliminating the address lines indicated by dotted lines in FIG. 4 of all the addresses of the memory 20 as an example. In such a case, a capacity of only 8K words is required for the memory 20. The memory 20, which operates as the recognition means 105 and the exposure pattern signal storage 106 concurrently, will be described more in detail later herein. The word configuration of the memory 20 affects the continuity and analog characteristic of the exposure pattern signal 111. According to the present embodiment, four (continuity) 2-bit (analog characteristic) pattern signals 111 are assumed to be generated in the scanning direction for each recording pixel. Eight bits (4×2) of data are thus stored in the memory 20 for each recording pixel. The ratio between continuity and analog characteristic in this configuration is determined as desired depending on the recording characteristic of the printer engine 108. The most significant four bits of the data for each recording pixel of the memory 20 are applied to a shift register 21, and the four least significant ones thereof to a shift register 22. The shift registers 21, 22 load the data by means of the signal CLK 12, and shift out by means of a signal 4CLK29 having a frequency four times as high as the signal CLK12. The 2-bit pattern signal 111 is thus transferred sequentially to the current converter 107 at a frequency four times higher than the signal CLK12.

Figure 6A:
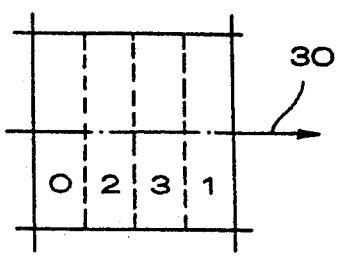
FIGS. 6A-6D are diagrams showing the processes before recording an image data according to an embodiment of the present invention.
Figure 6B:
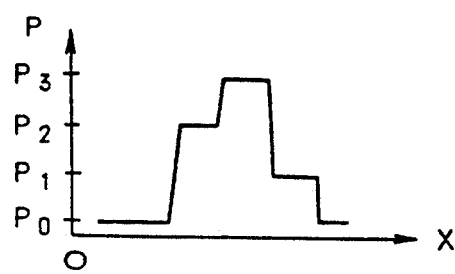
Figure 6C:
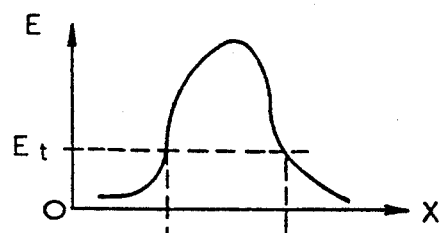
Figure 6D:
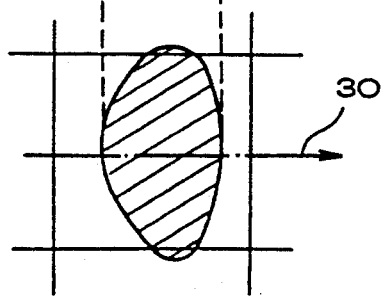
Figure 7A:
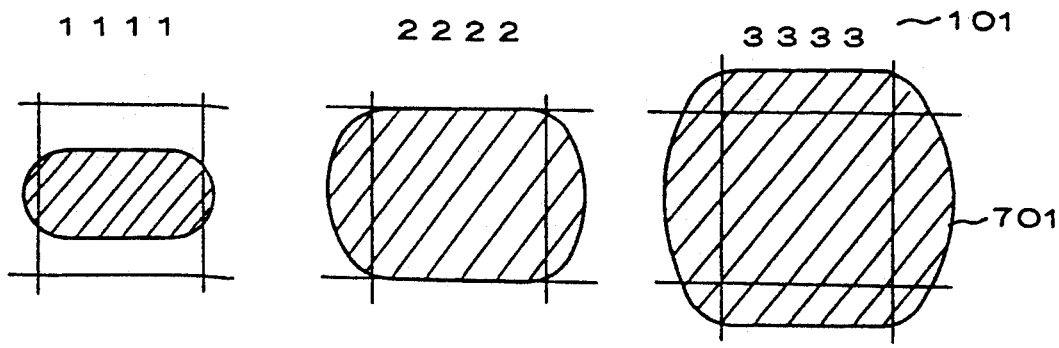
FIGS. 7A-7D are diagrams showing a main example of a pattern signal according to an embodiment of the present invention.
Figure 7B:
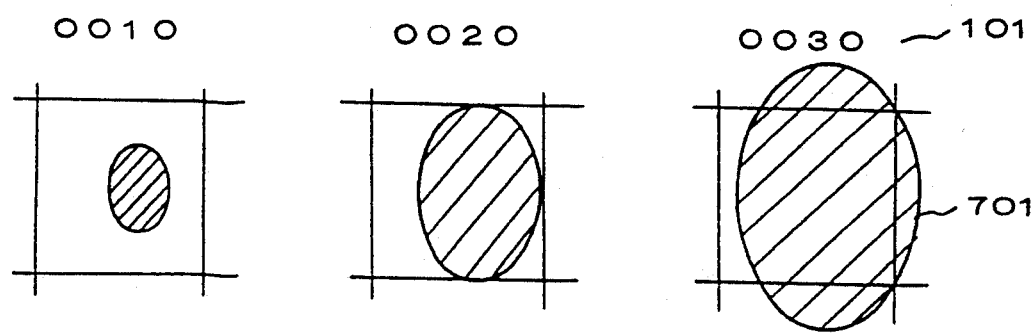
Figure 7C:
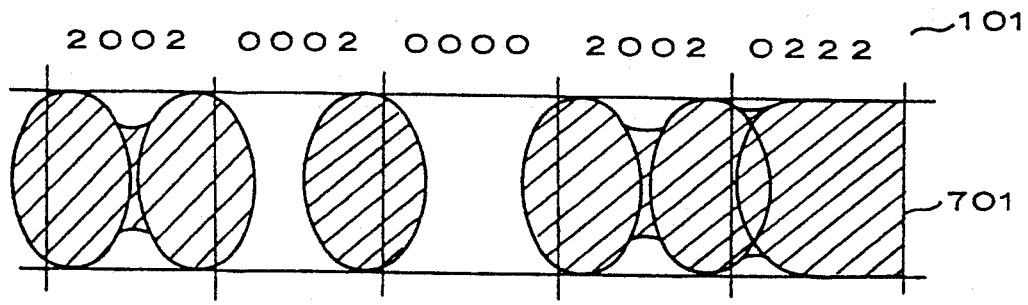
Figure 7D:
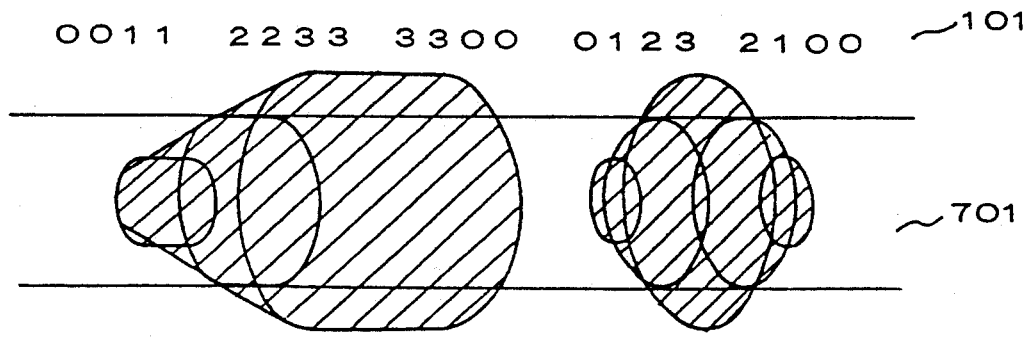

The current converter 107 energizes a laser diode 25 in accordance with the pattern signal 111. The most significant bits turn on and off a transistor of a constant-current circuit as determined by the current source 23 (current $I_1$ when turned on), while the least significant bits are used to turn on and off a transistor of the constant current circuit determined by a current source 24 (the current $I_0$ when turned on). The currents from these two circuits together with the current $I_b$ from a bias circuit 26 flow through the diode 25. FIG. 5 shows a characteristic curve representing the relationship between output P and current I of the diode 25. When the pattern signal 111 is zero, $I=I_b$ and $P=P_0(=0)$; when it is 1, $I=I_b+I_0$ and $P=P_1$; when it is 2, $I=I_b+I_1$ and $P=P_2$; and when it is 3, $I=I_b+I_0+I_1$ and $P=P_3$. Examples of the pattern signal 111 and an image subsequent to recording as related to recording pixels are shown illustratively in FIGS. 6A-6D. FIG. 6A is a diagram showing a recording pixel region, in which the central one-dot chain represents the scanning line 30 of the laser beam and the direction thereof. In this embodiment, since four pattern signals 111 are applied in the scanning line direction in the recording pixel region, the particular region is divided in four equal parts along the particular direction as shown. Assuming that the pattern signals 111 designated by 0, 2, 3 and 1 are applied to each partial region, the output of the diode 25 takes a form as shown in FIG. 6B. The corresponding exposure light quantity distribution on the light-sensitive material varies with the shape of the laser beam spot as shown in FIGS. 14 and 15. According to the embodiment under consideration, assume to use a longitudinally elliptical beam having the radius Rx equal to Pw/4 in main scanning direction and the radius Ry equal to Pw/2 in subscanning direction. An exposure quantity distribution on the light-sensitive material as shown in FIG. 6C is obtained. When this distribution is used for recording, binarization is secured by reference to the threshold exposure level Et for development, leading to a recording image shown in FIG. 6D. The pattern signal 111 in 256 different forms is available for the recording pixel region, of which main examples are shown in FIG. 7. FIG. 7A shows an exposure pattern signal 111 and the result of recording 701 in the recording pixel with the interior of a recording pixel exposed uniformly and the exposure amount changed in an exposure process. If the exposure amount is small, the recording dot is thinned in the sub-scanning direction and becomes laterally long. If the exposure amount is large, by contrast, the region adjacent to the recording pixel is also recorded undesirably. FIG. 7B shows the recording result of exposing a spot in the recording pixel while changing the exposure amount in the same manner as in FIG. 7A. In this case, the laser beam changes only in size while retaining the shape of the spot thereof shown in FIGS. 14 and 15, resulting in a longitudinal recording dot. Under an excessive exposure, therefore, the dot overflows the recording pixel region. FIG. 7C, which is also indicative of a spot exposure, shows that the position of the spot in the main scanning direction is not affected by the boundary of the recording pixels. With the approach of adjacent recording dots, however, they affect and come to fuse with each other. FIG. 7D shows that it is possible to record a wedge-shaped recording dot in the present embodiment as in the case shown in FIG. 16. According to the present embodiment, the quality of a recording image is improved with special emphasis placed on these features of an optical recording system.

Figures 27, 28:
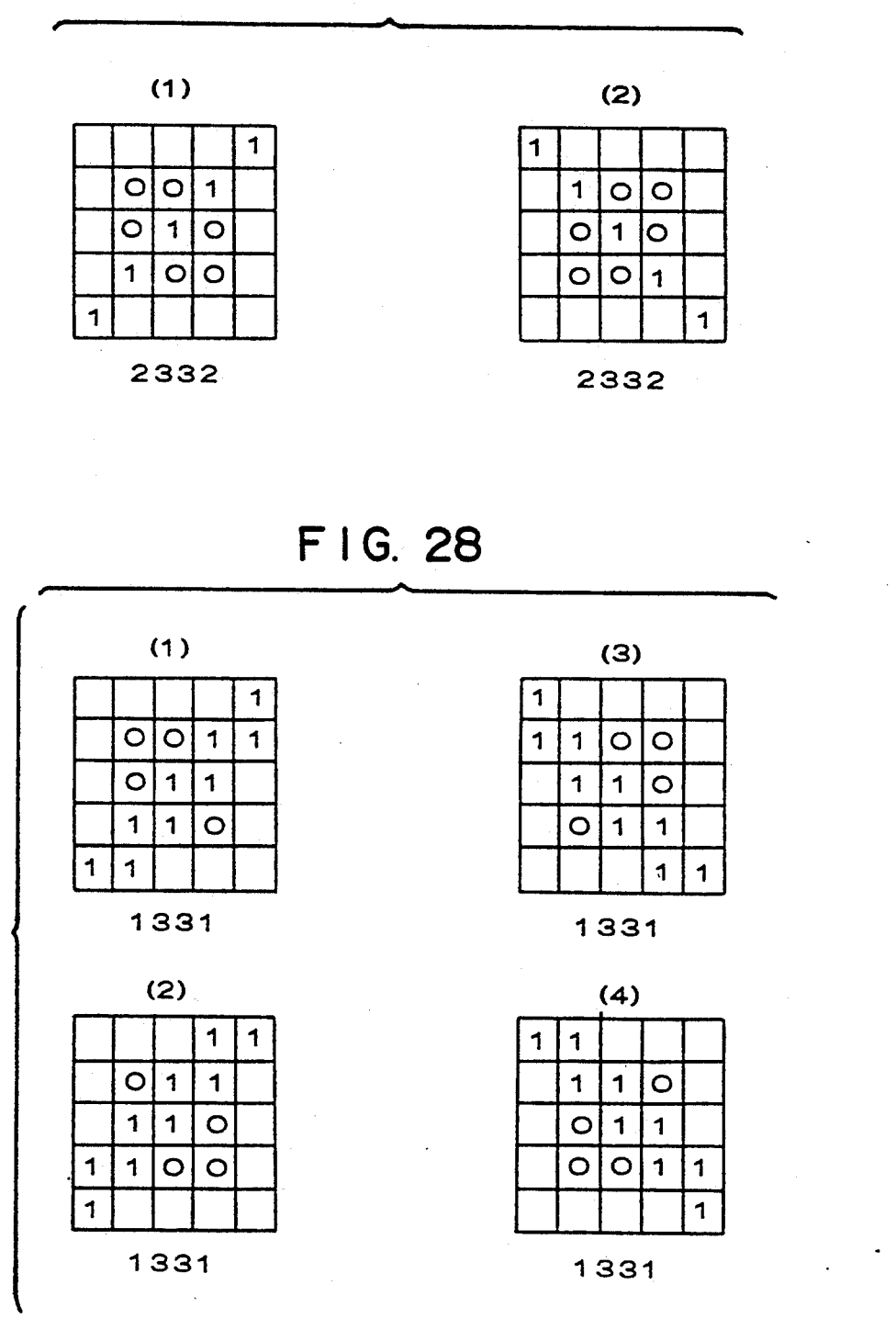

Now, the memory 20 will be explained. The memory 20, which has applied thereto a total of 25 pixel data 101 including a recording pixel and surrounding pixels, is capable of recognition in as many as $2^{25}$ different ways. Of all them, explanation will be made about a method of recognizing six image patterns which are correctable very effectively. The six types of image patterns involved are the solid image, straight line, pair line (a plurality of aligned straight lines looking like stripes), intersection, isolated point and a dot. A neutral image (an image without any special feature) and a method of processing thereof will be defined beforehand. A neutral image specifically indicates the one other than the above-mentioned six types of image (including solid image, straight line, pair lines, intersection, isolated point and dot). In other words, it is defined as a detailed portion of an image complicated in shape and impossible to record or reproduce according to the present invention. It is necessary, therefore, to transform a portion corresponding to a neutral image into an image pattern that can be recorded and reproduced. FIG. 8 shows a recognition pattern matrix 801, with a corresponding exposure pattern signal 111 and the result of recording 701 on the recording pixel. The recognition pattern matrix 801 has therein 25 units of factors. The factor "1" indicates the "1" state of the pixel data 101, that is, a "black dot"; "0" that of the pixel data 101, that is, a "white dot"; and a blank unit indicates that either "1" or "0" state will do. The respective factors correspond to the 25 input pixel data 101 shown in FIG. 2, and when all the factors coincide, it indicates that the particular recognition pattern has successfully been recognized. In FIG. 8, for instance, the pattern of FIG. 8A is assumed to have been recognized if the pixel data 101 of (I, J) is "1", and the pattern of FIG. 8B is involved if it is "0". The exposure pattern signal 111 to a recording pixel for a pattern is determined by the recording characteristics of the printer engine 108. A general characteristic is assumed to be "1221" for FIG. 8A and "0000" for FIG. 8B, with the recording result 701 as shown. Unlike in the conventional optical recording systems having a uniform exposure pattern in a recording pixel, a variation like "1221" for FIG. 8A improves the sharpness of a recording dot. Now, the processing for a solid image will be defined in FIG. 17. The situation in which the internal portion of a solid image is being worked on is recognized when all the nine pixel data 101 around the pixel data 101 of (I, J) are "1" on the recognition pattern matrix 801 shown in FIG. 17A. In the process, all the dots around the recording pixel are black, and therefore the exposure pattern signal 111 shown in FIG. 17B is set to the strongest "3333". The sum of the digits of the exposure pattern signal will be hereinafter indicated by a number in the parenthesis. The recording image 701 considerably overflows the recording pixel region as shown in FIG. 17B. As compared with the recording of a neutral pixel, however, irregular white portions or density irregularities are eliminated which otherwise might be caused by irregular paper feed or scanning line or development irregularities respectively. It is thus possible to produce an image of high quality. Also, this correction has no effect on other than the solid image (completely free of interference). Now, the processing for a straight line image will be defined with reference to FIG. 18. A longitudinal straight line is recognized by a recognition pattern matrix 801 of FIG. 18A and a lateral straight line by that of FIG. 18B. The longitudinal straight line, which has a succession of recording dots in longitudinal direction, has irregular line widths thereof eliminated which otherwise might be caused by irregular paper or scanning line feed, to the extent that a longitudinal recording dot shown in FIG. 18C is formed. This is also the case with a lateral straight line which may be formed in the manner shown in FIG. 18D. The phenomenon of eliminating the irregularities will be explained with reference to FIG. 23. FIG. 23A is diagram showing a conventional circular recording dot, and FIG. 23B a longitudinal elliptic recording dot both in recorded form. In FIGS. 23A and 23B, a gap g between the second and third scanning lines indicates an interval of scanning lines widened by irregular paper feed or scanning lines. A straight line thus thins out at the gap g in FIG. 23A, while a line of uniform thickness is recorded without being substantially affected by irregularities along the sub-scanning direction in FIG. 23B. The same result is obtained also for a lateral straight line by forming laterally long recording dots. The exposure pattern signal 111 is produced as "1332" and "2232". The exposure stronger than in the recording as a neutral pixel is intended to compensate for the recording characteristics of an optical recording system that an isolated straight line is liable to thin out. A diagonal line may also be recognized in similar fashion. FIG. 27 is a diagram showing a matrix 801 for recognizing a thin diagonal line having an inclination of 45 degrees. The exposure pattern signal 111 corresponding to a diagonal line image is liable to be generally recorded thinner than a longitudinal or lateral line. In this case, if the exposure pattern signal 111 is formed as "2332", a thick diagonal line as recognized by the recognition pattern matrix shown in FIG. 28 may result depending on the host system involved. Since there is no need of thickening the line further in this case, the exposure pattern signal 111 is produced instead as "1331". In this way, the correction of a diagonal line may be processed independently.

The processing of a straight line not isolated (lines with other black dots nearby such as pair lines) is defined in FIG. 19. A longitudinal line is recognized by a recognition pattern matrix 801 shown in FIG. 19A, and a lateral straight line by the one shown in FIG. 19B. These patterns in FIGS. 19A and 19B indicate that there are other black dots present two lines away from the straight lines to be recorded respectively. Images recorded thus have a slightly thick straight line portion under the effect of the black dots as shown in FIGS. 19C and 19D respectively. This inconvenience may be prevented by weakening the exposure slightly as compared with the case of FIG. 18. Now, the processing of an intersection image will be defined with reference to FIG. 20. FIG. 20A shows a recognition pattern matrix 801 for an intersection between longitudinal and lateral lines, and FIG. 20B that for an intersection between diagonal lines. A recording dot at an intersection is liable to blur considerably, so that the exposure is weakened as shown in FIGS. 20C and 20D as compared with in the recording of a neutral pixel. Now, the processing of an isolated spot image will be defined with reference to FIG. 21A. In order to compensate for the recording characteristic of an optical recording system that an isolated point is liable to thin out, it is necessary to secure an exposure as shown in FIG. 21B which is stronger than in the recording of a neutral pixel. Next, the processing of a dot image will be defined with reference to FIGS. 22A and 22B. In a method of tone production by density of each pixel in a one-dot image, it is necessary to secure an equal area of black and white portions, and for this purpose, the amount of exposure must be regulated in a fine manner. An excessive exposure would increase the black portion, while an insufficient exposure would result in an increased white portion. This inconvenience is effectively eliminated by modulating also the amount of exposure of the white portion. In the case under consideration, as shown in FIGS. 22C and 22D, a black dot of a dot image is recorded in a manner similar to a neutral pixel, and the white portion by setting the exposure pattern signal 111 to "1001" to expose the surrounding portion in slight fashion unlike in the case of a neutral pixel. The fine adjustment of an exposure pattern signal in this way permits the recording with equal areas of the white and black portions.

According to this embodiment, a variety of types of images including the solid image, straight line, pair stripes, intersections, isolated point and dot are subjected to such an exposure pattern signal as to assure the recording of a highest image quality on the printer engine 108, and therefore the quality of an image as a whole is improved without being affected by the correction of the exposure pattern.

The recognition pattern matrix 801 for recognizing the features of an image is not the sole means available for recognition but may be replaced by another means similar thereto with equal effect.

Also, it is of course possible to recognize other features of an image if the matrix 801 is replaced by another pattern.

Embodiment 4

Now, another embodiment of the present invention will be explained with reference to FIGS. 9 and 10. In the aforementioned embodiment, the exposure pattern signal 111 stored in the exposure pattern signal storage 106 is determined by a recording experiment conducted on each type of image. Such a method of determining an exposure pattern signal, in spite of its advantage of permitting a pattern setting taking finely detailed points into consideration, has its own limit in the types of images recognizable. A method of improving this disadvantage in determining the exposure pattern signal 111 by computations will be explained below.

Figure 9A:
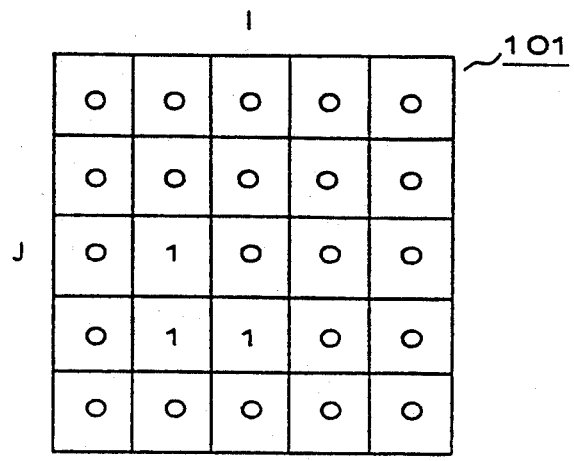
FIGS. 9A-9E are diagrams showing a method of determining the exposure pattern signal by a low-pass spatial filter according to another embodiment of the present invention.
Figure 9B:
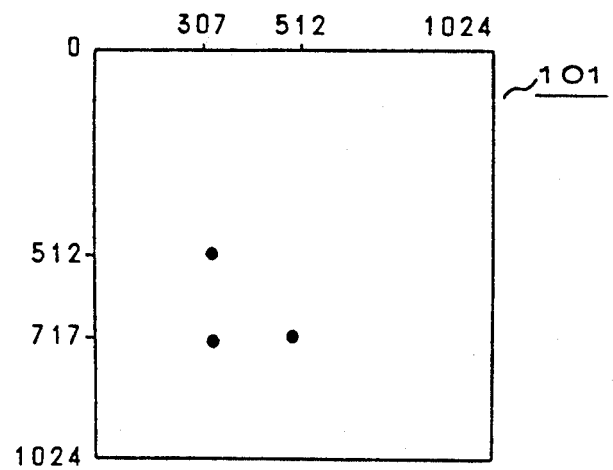
Figure 9C:
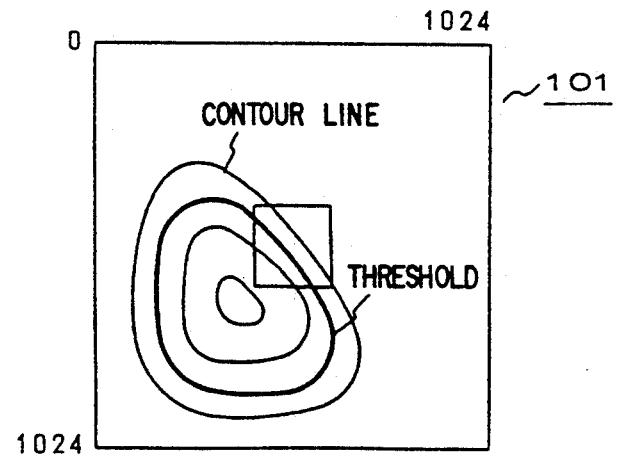
Figure 9D:
Figure 9E:
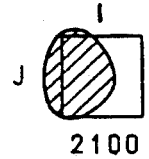
Figure 10A:
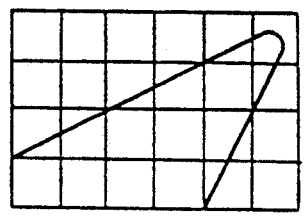
FIGS. 10A-10C are diagrams showing an example of recording by an exposure pattern determined according to another embodiment of the present invention.
Figure 10B:
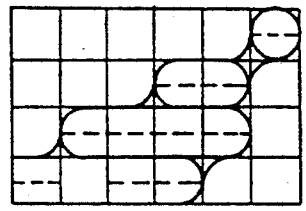
Figure 10C:
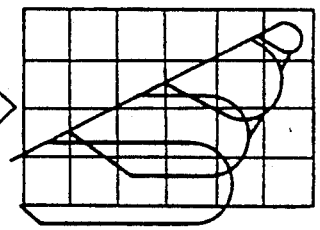

If a pixel data 101 sampled is to be restored to a two-dimensional continuous signal like an original image, a low-pass spatial filter is recommended. Specifically, according to a sampling theorem, signal-processing means should be used for passing only the frequency components less than one half of the sampling frequency for the pixel data 101. FIG. 9 is a diagram for explaining this method. First, assume that the recognition means 104 is supplied with a pixel data 101 having $25 (= 5 \times 5)$ meshes. The available types of such patterns are $2^{25}$ in number. All these $2^{25}$ types of patterns are filtered by interpolation in the computer. FIG. 9A shows the case in which $(I, J-1)$, $(I+1, J-1)$ and $(I+1, J)$ are all "1", and the others "0". This image data is allotted on a coordinate subdivided into $1024 \times 1024$ meshes as shown in FIG. 9B. Specifically, $(I, J-1)$ is rendered to correspond to $(512, 307)$, $(I+1, J-1)$ to $(717, 307)$ and $(I+1, J)$ to $(717, 512)$ respectively, so that these three points are assumed to represent "1" and the remaining points "0". Then, after Fourier transformation by computer, the zero- to third-power frequency components of all the low-frequency components are superposed for reproduction. As a result, real values are assigned to all the $(1024 \times 1024)$ points. In FIG. 9C, the points of real values thus assigned and having the same value are connected and indicated by a contour line simulating a mountain height. These processings permit the pixel data 101 to be regarded as a spatially continuous analog value. It is, however, impossible to use the pixel data thus produced as an exposure pattern signal 111 directly. This is by reason of the fact that an optical recording system is incapable of expressing continuous densities of a half-tone level directly, and is capable of recording only in a discrete manner in either the main or subsidiary scanning direction. This inconvenience may be overcome by the procedure mentioned below. First, in order to binarize the spatially continuous analog value shown in FIG. 9C, a certain threshold level is set to divide between a black portion associated with the pixel "0" and a white portion related to the pixel "1". If the contour line written by thick line in FIG. 9C is assumed to be a threshold level, the part inside thereof is determined to constitute the black portion. Then, an exposure pattern signal 111 that produces a black portion most similar to the particular black portion is determined by an experiment in advance. The exposure pattern signal 111, which is dependent on the performance of the printer engine or the recording characteristics, is not determined simply or absolutely. According to the present embodiment, it is assumed to be determined as a given pattern. For example, the exposure pattern signal 111 of the recording pixel (I, J) is assumed to be "2100". FIG. 9D shows the targeted black portion within the recording pixel, and FIG. 9E the result of recording by the printer engine with the exposure pattern signal 111 actually assuming a pattern of "2100". In this manner, the exposure pattern signals 111 are determined for all the $2^{25}$ combinations of the pixel data 101, and are stored in the exposure pattern signal storage 106. An example of a picture recorded using the data base 106 thus produced is shown in FIG. 10 in comparison with an example of a picture recorded by a conventional system. If pixels of an original picture as shown in FIG. 10A are sampled by partitioned meshes and recorded by a conventional recording system, misalignments (unevennesses) of diagonal lines and irregular intervals of thin lines come to appear in a sample obtained from meshes as shown in FIG. 10B. The use of a recording system according to the present invention, in contrast, eliminates the misalignment and irregularities as seen from FIG. 10C.

Embodiment 4

According to Embodiment 3 described above, the input pixel data 101 is provisionally converted into a continuous analog value. This process of analog conversion may be effectively utilized for line density conversion, especially, the expansion compression processing. The line density conversion is defined as a process of converting a recording data to assure a line density fitting the particular recording system. Try to record a data by, for example, a recording system having a resolution (which is interpreted as the line density herein) of 24 pixels/mm connected to a host system 103 which is intended for use with a recording system having a resolution of 16 pixels/mm. The image plotted by this recording system would be compressed into 16/24 the size of the desired one. In order to prevent this inconvenience, it is necessary to convert an image of 16 pixels/mm into that of 24 pixels/mm by a process of what is called image data synchronization.

Either an expansion or compression process is made possible if this conversion process is applied to a recording system of the same resolution. Specifically, in the case where the ratio of the resolution after line density conversion to that before conversion of a recording system is larger than unity, an expansion process results, and compression obtains if it is smaller than unity. An example of the expansion compression processing will be described below with reference to FIGS. 29 and 30.

(1) Line density conversion to higher resolution

Figure 29:
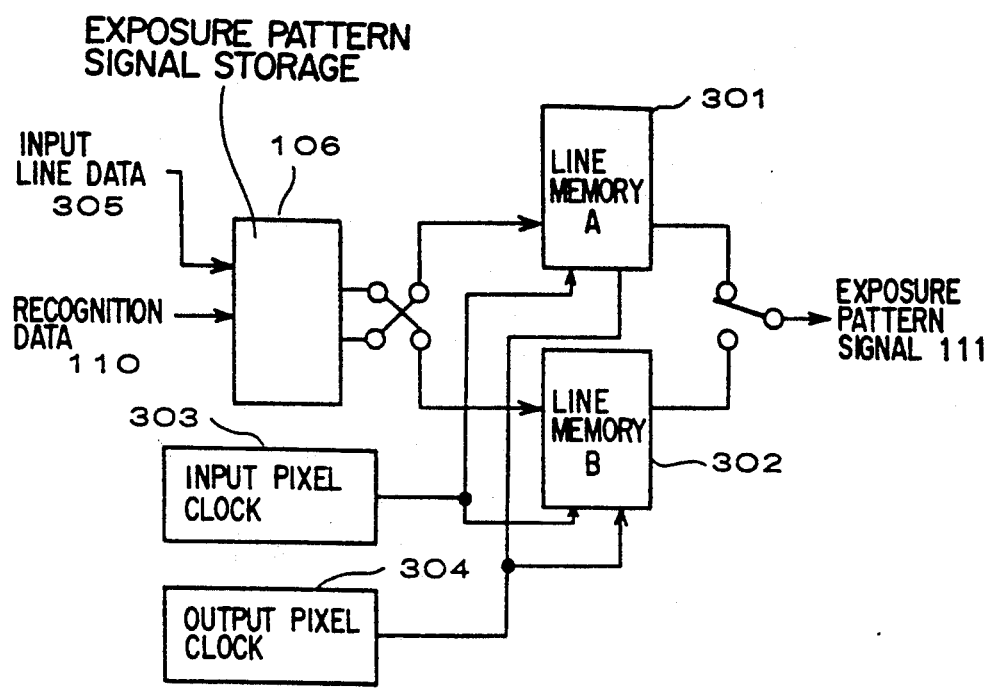
FIG. 29 shows a configuration of a line density conversion means according to still another embodiment of the present invention.

A circuit configuration according to the present embodiment is shown in FIG. 29. First, reference is made to a recording system of which the scanning in the main direction (lateral direction on the page) is continuous and that in the subsidiary direction (longitudinal direction on the page) is discrete. In this embodiment, a recording system having a scanning line density of 24 pixels/mm (with the recording speed of 9 mega pixels/second) is assumed for converting an image of 16 pixels/mm into that of 24 pixels/mm. If the image data are to be synchronized, the recording speed $S_0$ (pixels/second in the recording system is required to be related the input speed Si (pixels/second) for application of the pixel data 101 to the recording system in the manner mentioned below. Specifically, the input speed of pixel data to the recording system is determined to be 16/24 (that is, ⅔) times as large as $S_0$ in line ratio and $S_0$ times the square of ⅔ in area ratio. Assuming that the input speed is determined as four mega pixels/second, for example, the recording system which has a recording speed of a maximum of 9 mega pixels/second in performance, is operated at a recording speed of 6 mega pixels/second. In the case of the circuit shown in FIG. 29, for instance, the frequency of the clock 303 for the input pixels is set to 4 MHz, and that of the clock 304 for the output pixels to 6 MHz. In this way, in the main scanning direction where the data is continuous, all that is required is to change the recording speed, while in the sub-scanning direction where the data is discrete, it is necessary to generate scanning lines anew. For this purpose, the exposure pattern signal storage 106 has stored therein input line information 305 in addition to the recognition data 110. This input line information 305 is assume to indicate whether an input line is odd- or even-numbered. In the circuit shown in FIG. 29, the data from the data base 106 flows in a sequence corresponding to the input line information.

Figure 30A:
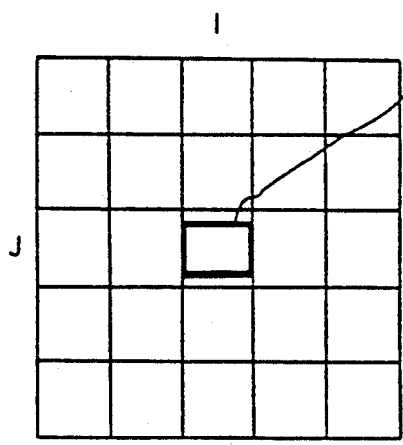
FIGS. 30A-30B are diagrams for explaining a line density conversion processing for expansion according to still another embodiment of the present invention.
Figure 30B:
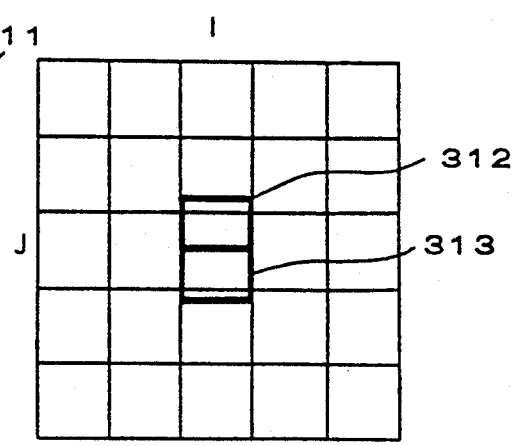

First, if the input line information 305 is odd-numbered, the black portion of the recording pixel (I, J) in FIG. 9 within a pixel 311 is compressed to ⅔ in size along the sub-scanning direction, which portion is further expanded to 3/2 in size along the sub-scanning direction, as shown in FIG. 30A and applied as an exposure pattern signal 111 to the line memory A (301) and the line memory B (302).

If the input line information is even-numbered, on the other hand, the black portion within the pixels 312 and 313 compressed to ⅔ in size along the sub-scanning direction is processed in similar manner. In this case, since the exposure pattern signals 111 for two lines are generated at a time, they are stored in the line memory A designated by 301 or the line memory B designated by 302. The transfer speed for output to the recording system is 3/2 times higher than that of the line data input, and therefore these speeds are not synchronized for signal transfer. The object of line memories 301 and 302 is to synchronize the timing of asynchronous generation of the exposure pattern signal 111.

If these processing operations are performed by a recording system of 16 pixels/mm in scanning line density (with the recording speed assumed to be four mega pixels/second), the expansion to 3/2 in size is achieved.

(2) Line density conversion to lower resolution

This process will be explained generally with reference to FIG. 29. As this process is similar to the one mentioned above, however, the present explanation will be limited to only the processings other than expansion. The present process is performed by the same circuit configuration as that used for the aforementioned embodiment. In the embodiment under consideration, it is assumed that the scanning line density of the recording system having a recording speed of four mega pixels/second is 16 pixels/mm and an image of 24 pixels/mm from a host system 103 is converted for recording into an image of 16 pixels/mm.

First, if the frequency of the output pixel clock 304 of the recording system is 4 MHz, the frequency of the input pixel clock 303 assumes a value multiplied by a factor of the square of 3/2, that is, 9 MHz. The recording under this condition attains a line density of 16 pixels/mm in the direction of main scanning. (If the frequency of the output pixel clock 304 is increased to 6 MHz, it is of course possible to record at a line density of 24 pixels/mm).

Now, a data flow according to the present embodiment will be explained with reference to FIG. 29.

The input line information R (305) applied to the exposure pattern signal storage 106 is assumed to be the remainder of the number of lines divided by 3. In accordance with the content of the input line information, the data flow from the exposure pattern signal storage 106 changes in the manner mentioned below.

Figure 31A:
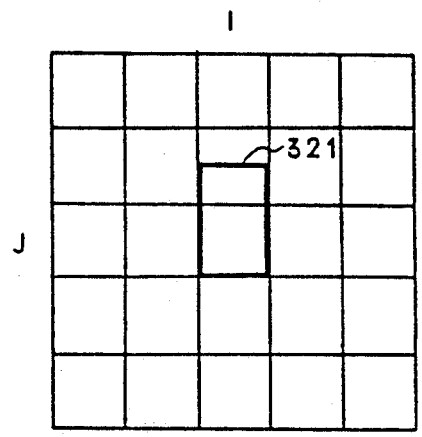
FIGS. 31A-31B are diagrams for explaining a line density conversion processing for compression according to still another embodiment of the present invention.

First, when R=0, as shown in FIG. 31A, the black portion in the pixel 321 covering a distance of 3/2 times as long in the sub-scanning direction further compressed by ⅔ in sub-scanning direction from the recording pixel (I, J) in FIG. 9, and the resulting signal is applied as an exposure pattern signal 111 to the line memory A (301) or the line memory B (302).

Figure 31B:
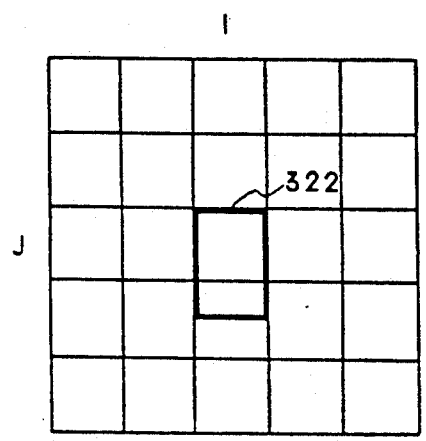

When R=1, on the other hand, as shown in FIG. 31B, a pixel 322 is considered, followed by a procedure similar to the one taken when R=0.

When R=2, the process is different from the foregoing one, and no output is applied to the line memories.

The synchronization of data transfer between the line memories and the recording system is of course taken charge of by the line memories as in the case of expansion processing.

If this process is performed by a recording system having a scanning line density of 24 pixels/mm (with the recording speed assumed to be 9 mega pixels/second), the compression processing to ⅔ times as large is achieved.

In the aforementioned line density conversion, the ratio between the input pixel clock 303 and the output pixel clock 304, the size of the pixels 311, 312, 313, the number of lines generated or the number of line memories based on the number of lines, may be changed or modified separately or in any combination for application to the conversion with any line density magnification. The line density conversion, therefore, is not limited to the process mentioned in the aforementioned embodiment.

Embodiment 5

Another embodiment of the present invention will be explained below with reference to FIGS. 11A to 11C and 12A to 12G. In recent years, various forms of characters have been used on the word processor or the like devices. They include not only Ming-style and Gothic types but also a script form similar to hand-written or calligraphic type as well as a "circular" type of marked individuality. These fonts are required to express not only the meaning expressed by the characters involved but also the image sensed from the particular forms of characters. It is, therefore, necessary to draw the portions of each character having a significant design feature. A portion called "hane" in Japanese or tail (pointed portion) of the script type, for example, must be recorded sharp enough to the very dot at the foremost end. The aforementioned embodiment reproduces the input data 1 from the host system 3 faithfully but not the information other that included in the input data 1. A reproduction with some individuality might improve the quality of a specific image but would be liable to deteriorate the quality of many other images. In order to solve this problem, a ROM 20 in FIG. 4 is provided with a data UD 27 for a specific user to give an instruction on the form of character desired by him, such as "a form for presenting a beautiful script type". The recording system is then capable of recording the character placing emphasis on the particular feature without taking the effect on other images into consideration. There are innumerable characters of script type. Now, let us consider how to deal with the whole concept including an effective manner of pointing or shaping the tail. As an example, take the tail portion at the forward end of a Japanese "hirakana" script character " ".

Figure 11A:
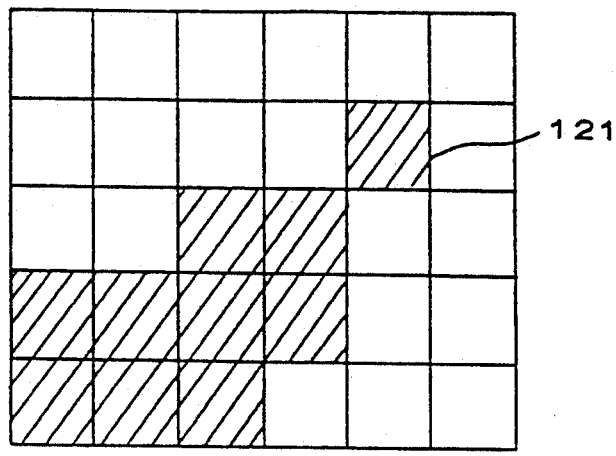
FIGS. 11A-11C are diagrams showing a method of exposing a script image pattern according to another embodiment of the present invention.
Figure 11B:
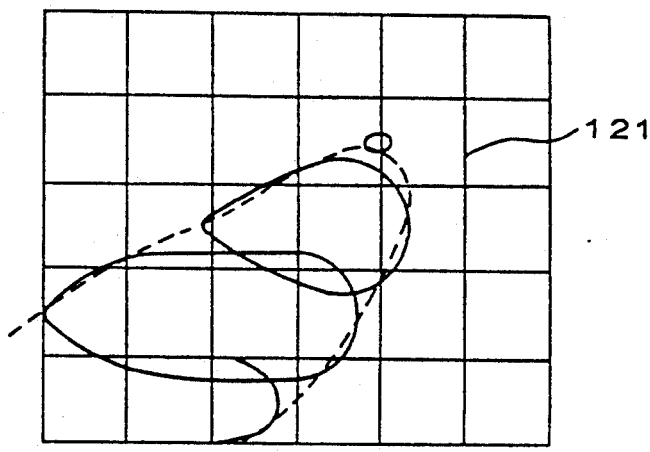
Figure 11C:
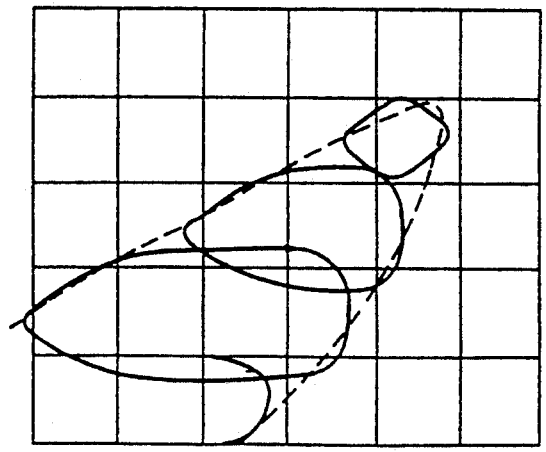
Figure 12A:
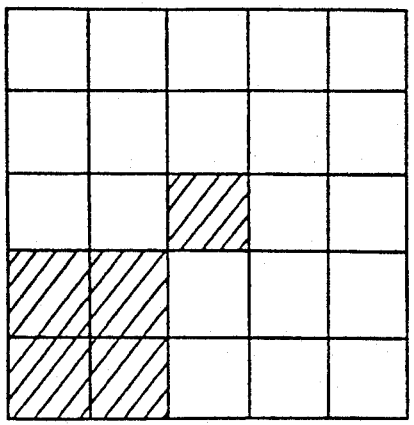
FIGS. 12A-12G are diagrams showing a method of exposure by changing the exposure pattern according to another embodiment of the present invention.
Figure 12B:
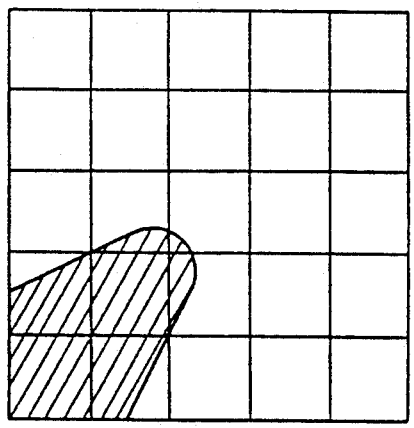
Figure 12E:
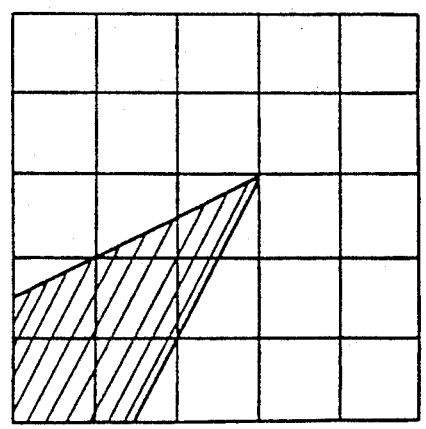
Figure 12C:
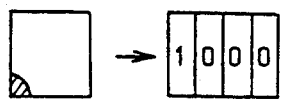
Figure 12F:
Figure 12D:
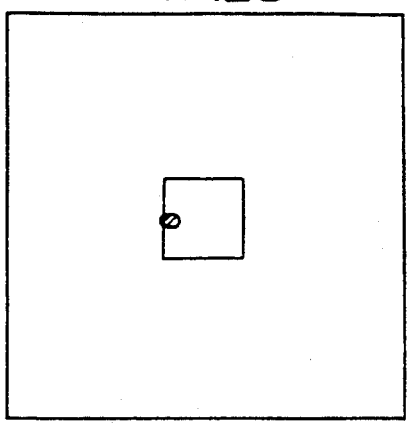
Figure 12G:
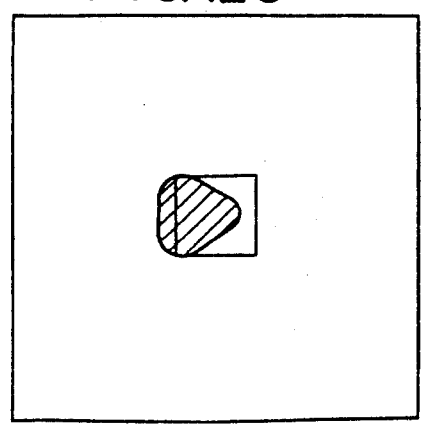

The image pattern shown in FIG. 11A is an input data 101 received by the recording system from the host system 103. This image pattern represents a sample of the forward end of the character "L". FIG. 11B shows the result of recording according to the embodiments already described. As seen from this result, the exposure by the laser irradiated in the forward-end dot region 121 is reduced, and the foremost end of the character "L" is rounded in slightly short form. This roundness may be extended further forward by changing the exposure pattern signal of the dot 121. The images shown in FIGS. 12B, 12C and 12D are recorded according to the recording characteristics explained with reference to the aforementioned embodiments. Let us consider a case in which the shape of an image shown in FIG. 12B binarized through an interpolation filter is changed to form an ideal pointed portion as shown in FIG. 12E. For this purpose, the exposure pattern signal 111 is changed to produce a recording image most similar to this sharp form. According to the embodiment under consideration, "1000" is changed to "3210" as in the aforementioned embodiment. The significant feature of the optical recording system according to this embodiment which is especially different from that of the conventional recording systems lies in the manner in which the "tail" portion at the forward end of the character "L" is dealt with by recognizing the characteristics thereof and processing them as an exception in the manner mentioned above. As a result of this processing, an image similar to the one shown in FIG. 12E is produced in a form beautiful to the foremost end. If several portions considered to improve the image quality by the process mentioned above are detected out of the form of a character, and the exposure pattern signals corresponding to them are changed as a modification of the aforementioned processing, a script type of character more beautiful in general form is recorded. The other portions of the character not changed have a normal exposure pattern signal not deteriorated in image quality.

The present embodiment which has been described with reference to a script character is not limited to such a form of character but may also be applied with equal effect to all types of characters and images which might be improved in quality if recorded with some features attached in shape. Take a symbolic character or a pattern as an example. In more general applications, only a straight line having a specific angle may be changed in line width (thickness), an intersection of straight lines may be sharpened or a recorded image may otherwise be stressed in a manner fitting the desire of the user.

Embodiment 6

Now, still another embodiment of the present invention will be explained with reference to FIG. 13.

Generally, an optical recording system has a density regulator for the image recorded over the whole paper. The average density of a particular image may be changed manually or automatically by use of such a means.

In the case of the laser printer based on reverse development, for instance, the average density of a recorded image is reduced with the uniform decrease in the amount of laser light irradiated on the light-sensitive material. Since an image to be recorded includes various types of images including a solid and straight line, however, the image quality is also deteriorated with the decrease in average density resulting from a decreased exposure amount. In recording a solid image portion, for example, an overlapping of exposures is sometimes used to fill the gap caused by the lack of exposure due to the overlapping of scanning beams. Even when the exposure is reduced to prevent such an inconvenience, however, the change in recording density is not immediately reflected in the recorded image in initial stages of recording in terms of time. Further, a thin image portion, which is often left not overlapped, is liable to become excessively thin in line width. In an actual image to be recorded, the user may desire to reduce only the density of the solid image portion in the first place while leaving the thin image portions as they are. Also, there may arise a problem of the solid image portion being affected by a noise (jitter or the like) with a certain degree of decrease in exposure. Under such a condition, even an image of a thin portion may be deteriorated in quality. In view of the difference in the rate at which longitudinal and lateral lines decrease in line width, for example, irregular line widths may result. If the average density of an image is to be reduced without adversely affecting the quality of a recorded image, therefore, it is necessary to provide means for controlling the exposure pattern signal 111 independently for each image. A technique for such a process will be explained below.

First, a user data UD 27 shown in FIG. 24 is supplied with a general image density data from the user or the host system 103 to determine an exposure pattern signal 111 for each image.

Figure 13A:
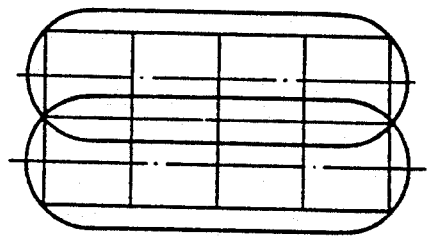
FIGS. 13A-13E are diagrams showing the result of recording according to another embodiment of the present invention.
Figure 13B:
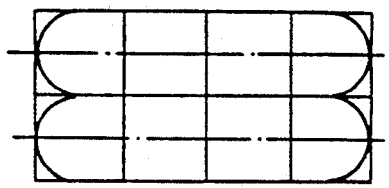

The density of the solid image portion may be reduced by reducing the pulse width of the exposure pattern signal 111. This also stabilizes the image quality. FIGS. 13A, 13B, 13C, 13D and 13E show the result of recording effected in such a way. Specifically, FIGS. 13B and 13C show a conventional case of recording by density control plotted for comparison. As seen from this, a decreased exposure amount leads to the thinning of lateral lines. The laser printer has such a characteristic that the jitter of the scanning line feed is caused significantly along the sub-scanning direction perpendicular to the main scanning direction. The conventional systems, therefore, may cause a density irregularity, if left without being improved.

Figure 13D:
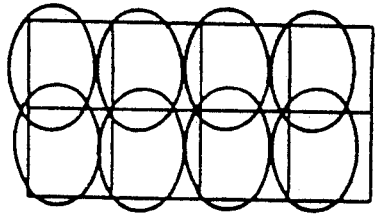
Figure 13C:
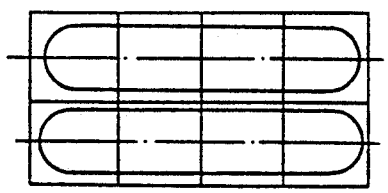
Figure 13E:
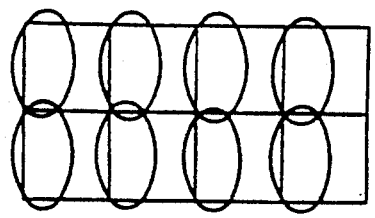

FIGS. 13D and 13E show further embodiments of the present invention, in which the density is controlled primarily by the magnitude of the pulse width of the exposure pattern signal 111. A decrease in density by use of a longitudinal beam spot leads to a longitudinal thin line. In this case, the density is controlled in stable manner since the effect of jitter is small in sub-scanning direction. An exact form of an exposure pattern signal for each density pattern is determined empirically taking the balance with other images into consideration and stored in the exposure pattern signal storage 106. Now, let us consider the recording of a straight line. A lateral line may be reduced in width by reducing the exposure pattern signal 111 uniformly. By doing so, the uniformity of line width is maintained after recording and thus an image of high quality is produced. As to a longitudinal line, on the other hand, the line width thereof is reduced by reducing the pulse width of the exposure pattern signal 111. As a result, the density irregularity is reduced and a high-quality image is produced as in the case of a solid image. In the case of a pair of thin lines, the interference between the thin lines reduces the difference of the amplitude of exposure amount between black and white. The exposure pattern signal 111 is thus set with the threshold level of exposure coinciding with the center of amplitude. An example of an image set in this way is an intersection of straight lines or an isolated black dot. For these images, too, an optimum exposure pattern signal for reproducing an image density designated for each of them is set and stored in the exposure pattern signal storage 106 in the manner similar to the aforementioned processing.

Once the density of a recording image is set in the manner mentioned above, it is possible to record by controlling the exposure pattern signal 111 for each image independently.

Figure 32:
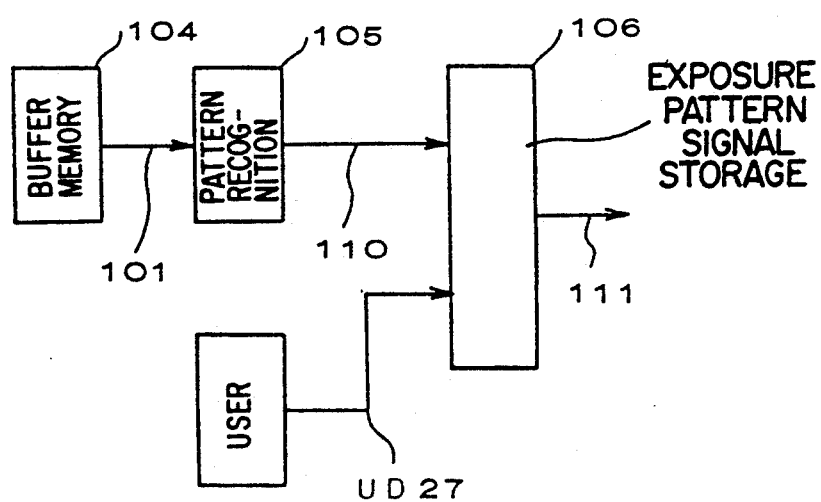
FIG. 32 is a diagram for explaining a data flow of the exposure pattern signal storage according to still another embodiment of the present invention.

More specifically, as shown in FIGS. 32 and 33, eight different features are extracted by the pattern recognition means 105 from the image data 101 and assigned with identifiers 1 to 10. (See FIGS. 33A and 33B)

If the user is to designate and set four stages of image density, say, 0 (light) to 3 (dark) as a user data UD 27, on the other hand, an exposure pattern signal 111 is prepared for each of all combinations of the density stages. (See FIG. 33A) In this embodiment, the image density of "2" is assumed to provide a reference. The optimum exposure pattern signal for each feature thus normally takes a value associated with the number "2" of the user data UD 27.

As described above, an image is exposed with an independent exposure pattern signal for each portion having an image feature in such a manner as to draw a most beautiful picture in relation to each image density designated by the user. An optimum recording image is thus produced.

The present invention may also be applied to the LED printer easily by replacing the main scanning direction with the sub-scanning direction according to the present embodiment.

Embodiment 7

Still another embodiment of the present invention is shown in FIG. 24. FIG. 24 is a diagram showing a method of processing an input image data from a host system. The input pixel data 101 from the host system 103 is sent to a buffer memory 104, and a pattern recognition means 105 finally produces a recognition data 110 along the route of flow shown in FIG. 1. This route of flow may be arranged in more orderly manner into the following three steps:

(1) The input pixel data 101 from the host system 103 is applied to the buffer memory 104 in the light quantity control means 109.

(2) The buffer memory 104 has stored therein a pixel data corresponding to the recording pixel and the surrounding pixel data within a predetermined range therefrom, which data are collectively sent to the pattern recognition means 105.

(3) The pattern recognition means 105 checks the pixel data thus sent thereto from the buffer memory 104, and supplies the exposure pattern signal storage 106 with the recognition data 110 obtained by recognizing the pixel data corresponding to the recording pixel.

According to the present embodiment, the recording data 111 is produced in correspondence with the recognition data 110. Assume that the recording image produced by the printer engine 108 is replaced by a control function $S_0$ and the control variable of the control function $S_0$ is a laser light quantity value $x_{ij}$ associated with the recording characteristic of the printer engine 108, where $x_{ij}$ corresponds to the storage data described in (2) above.

By relating a control function for a given data to a control variable thereof in this way, the input image data 101 from the host system may be defined by a one-dimensional control function like a control function S and a control variable $x_d$ thereof, a where $x_d$ is a recording density value of the particular pixel.

The use of the recognition address 110 as an index address for determining the control function $S_0$ as explained above enables the data processing method according to the present invention to be suitably applied to the data processing on the computer.

The control function $S_0$ corresponding to the recognition data described above may take a form as shown below as in the aforementioned embodiment of the present invention.

(1) Solid image: $S_1$
(2) Isolated straight line: $S_2$
(3) Unisolated straight line: $S_3$
(4) Intersection: $S_4$
(5) Isolated point: $S_5$
(6) Dot: $S_6$
(7) Longitudinal recording dot: $S_7$
(8) Other forms: $S_8$ In the above-mentioned case, the input data $x_d$ from the host system is processed for determining a control function with the recognition data as an index address (corresponding to an identifier). As an alternative, a corresponding control function forming a pair with the input pixel data from the host system 101 may be designated (as an index address or index number, for instance), or a control command (which is decoded and decomposed into a final index address and other control instructions) may be applied in a form combined with the input pixel data from the host system. In short, what is required is the presence of a data capable of determining a control function in accordance with an input pixel data.

The control variable $x_{ij}$ of the control function mentioned above, which is a value representing the laser light quantity, is not a permanently constant value but is affected by the secular variations of the component parts in the processes required for recording mentioned above. As a result, the light quantity value may be corrected at an appropriate frequency in order to maintain the density of quality of a recorded image at a predetermined level.

A method conceivable for correcting the light quantity value is by detecting the deterioration of photo-conductivity of the surface of the light-sensitive material (the characteristic of resistance value in the surface changing under exposure to light), the deterioration and charging reproducibility of the developer, the deterioration of the laser light source characteristic of the exposure means and the mechanical play in the recording process, and rewriting the light quantity value appropriately.

Further, apart from the correction to compensate for the secular variations of the light quantity value as described above, a light quantity value may be set, changed or corrected arbitrarily as desired by the user of an optical recording system according to the present invention. In this way, an optical recording system offering an operating ease to the user is provided according to the present invention.

Embodiment 8

Figure 34:
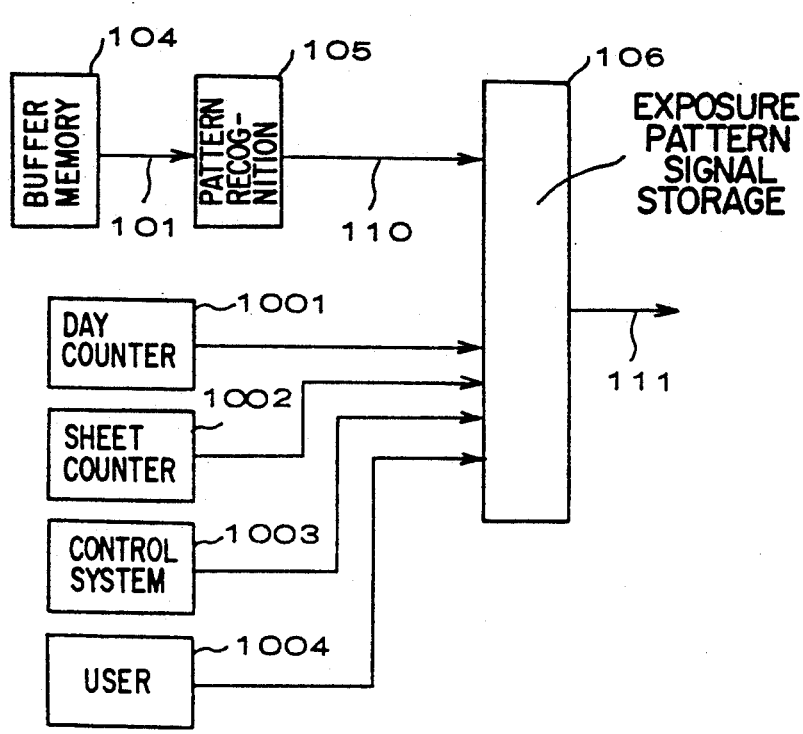
FIG. 34 is a diagram for explaining a configuration of the exposure pattern signal storage according to still another embodiment of the present invention.

A still further embodiment of the present invention will be explained with reference to FIGS. 34 and 35. Many processing parts of the optical recording system are subjected to secular variations (or change with time). Also, the optical recording system, which is used in great numbers of units over a long period of time without being attended by the operator, desirably requires repair or check or replacing the parts subjected to secular variations on as few occasions as possible. In other words, both a high maintenance reliability against a fault and a service life of the parts as long as practicable are desired. The light-sensitive material, for example, deteriorates in photo-sensitivity or resolution causing a decreased density or the blurring of a recorded image with the lapse of operation time. The effect of this deterioration varies with the type of the image recorded. A compensation for the secular variations of each case, depending on the type of an image involved, would reduce the effect of deterioration. FIG. 34 shows a configuration of a circuit for such a compensation. The secular variation is affected by both the lapse of time and the number of sheets recorded as well as the actual length of time the system is operated. The information from a day counter 1001 and a sheet counter 1002 after a part change, the information from a control system 1003 (which maintains a constant charge potential by adjusting the potential of a charger automatically even when the charge potential changes by secular variation) for controlling the charge potential or the like and the information 1004 from the user or serviceman, should be combined to make a decision. These data are recommendably applied as a user data UD 27 to the exposure pattern signal storage 106. Upon detection of a secular variation, an exposure pattern signal 111 corresponding to the secular variation is produced for each image having a feature recognized by the recognition data 110 thereby to compensate for the image quality deterioration.

According to this embodiment, the deterioration of the image quality due to the secular variation is prevented contributing to a long operability and service life of the parts.

Figure 35:
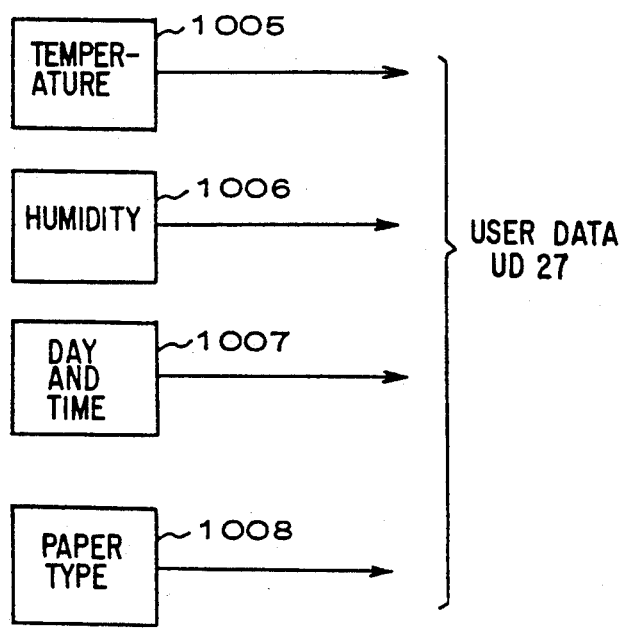
FIG. 35 is a diagram for explaining a configuration of the user data of an exposure pattern signal storage according to still another embodiment of the present invention.

Further, as shown in FIG. 35, the environmental information such as temperature 1005, humidity 1006, time or the day and hour 1007 may be used as the user data UD 27. The recording characteristics of an optical recording system also depend on the change in these environmental conditions. The blurring of an image, for example, is a common phenomenon in an environment high in temperature and humidity. Since the degree or manner of blurring varies with the type of the image recorded, compensation is necessary for each image recognized by the recognition data 110. The image quality deterioration caused by environmental conditions is thus reduced or eliminated. The recording characteristics of an optical recording system are also dependent to a large measure on the type of paper user (including thickness, roughness or material). A high-quality image is produced regardless of the paper specification by determining the exposure pattern 111 independently in accordance with the type of an image to be recorded.

The field of applications will further widen if, for example, the information 1008 relating to the type of paper is supplied from a sensor for detecting the paper specification included in a paper cassette or the like.

Embodiment 9

Figure 36:
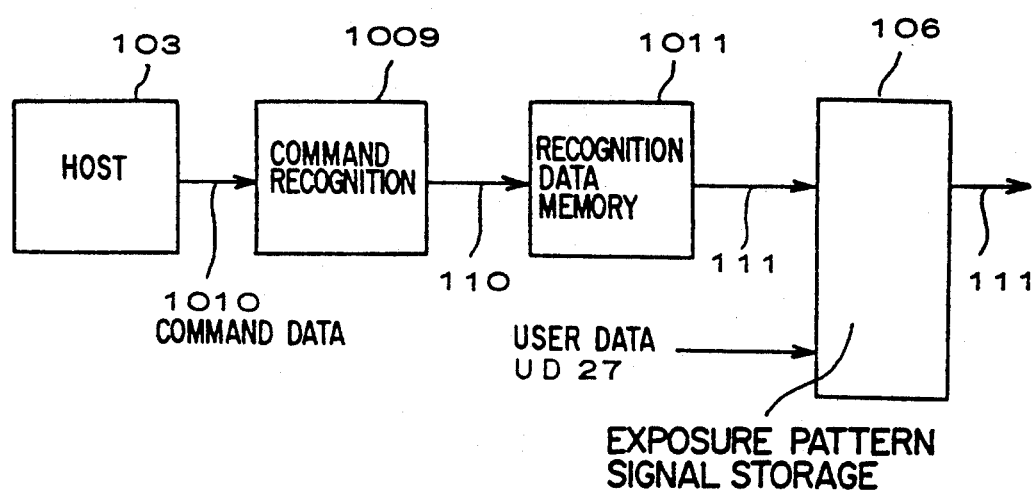
FIG. 36 is a diagram for explaining a configuration of the exposure pattern signal storage in command form according to still another embodiment of the present invention.

Still another embodiment of the present invention will be explained with reference to FIG. 36. In the aforementioned embodiments, the output of the host system 103 is assumed to be the pixel data 101. Instead, if it is assumed to be a command data 1010 for plotting a circle, a straight line, a character or the like, it is possible to standardize the processing operations of an optical recording system according to the present invention and therefore to determine the processing steps in advance. In the case where an image to be recorded is given by a line (straight line) command, for example, a straight line may be expressed completely by defining a code representing a straight line and the coordinate of the starting and terminating points. The use of the data 1010 in this command form permits the resulting command data to be decomposed or developed into the pixel data 101, and then transferred to the optical recording system for recording. According to the present embodiment, the command data 1010 is sent directly to the recording system. The recording system according to the present invention applies this data 1010 to command recognition means 1009 where it is converted into a recognition data 110 for each pixel. The recognition data 110 included in the command recognition means may take the form of approximately ten identifiers as shown in FIG. 33. A recognition data memory 1011 for storing the recognition data 110 requires a storage capacity of four bits per pixel. If the sequence of recording in the recognition means 1009 is different from that in the recording system, a capacity covering one image is required for the recognition data memory 1011. The recognition by the recognition means 1009 is easier than that from the pixel data 101 described with reference to the foregoing embodiments. The reason is that such attributes as straight line or application of a color to the whole images are encoded and inputted in the form of command data. In other words, what is required is only to decode in a predetermined way by reference to table information or the like. An infinite number of command codes cannot be prepared. If corresponding identifiers are assigned to all the required commands, however, recognition is implemented completely and accurately. As to a command indicating a straight line, for example, the inclination is calculated from the starting and terminating points thereof and is used for classification into a longitudinal, lateral or other types of line. If the identifiers for all the images to be processed are stored in the recognition data memory 1011, the recording by the recording system is effected completely. The sections subsequent to the recognition data memory 1011 are identical to the corresponding sections of the embodiments already explained, and therefore will not be described again. The present embodiment makes possible accurate recognition of all types of image data and thus produces a high-quality image recorded with a higher degree of correction. Another advantage of recognizing from a command is a higher degree of recognition. Main recognition items of the pixel data in the number of about ten shown in FIG. 33 are sufficient. Character modifications such as the underline, netting (shading), style, doubling in size, oblique or black-and-white reversal become readily recognizable. Further, the color recording by attaching individual color information to characters modified with the underline or the like as well as simple coloring to only characters (i.e. not modified by the underline), is possible. Also, even layout information for arranging an image-plotting region is recognized. The image may be divided into the character region, pattern region and halftone region, for example, so that different exposure pattern signals may be set to assure a thick character in the character region, an accurate line width in the pattern region and a precise gradation in the halftone region. The recognition means 1009 and the recognition data memory 1011 according to the present embodiment are not necessarily built in the optical recording system, but may stand free or be incorporated into the host system 103.

Embodiment 10

Still another embodiment of the present invention will be explained with reference to FIGS. 37 and 38. It is often desired to record in different colors some characters or numerals requiring emphasis in sentences or patterns. To meet this requirement, a recording system has been developed which is capable of recording a multi- or full-color image including red or green as well as black in monochromatic color print. Such a recording system receives and processes the information of black and other colors separately from each other, and therefore, it is necessary to prepare a document and pattern having the double-color information in advance. Most of the processing or recording systems including the word processor and facsimile as well as documents themselves handle a single color, and it is very inconvenient if a document in two colors is required. A technique for converting a single-color into a double-color document in the recording system is required. It is of course necessary to secure compatibility with an ordinary mono-chromatic recording system, although such a double-color recording system may be designed independently of the single-color system with the extension of use thereof. In ordinary documents prepared in single color, portions requiring emphasis are sometimes modified by underline, netting, style change (such as Gothic), double size, oblique size, oblique style or black-white reversal.

In recording a document in a single color of black by a double-color recording system, the functions of the recording system will be effectively utilized while at the same time producing a rational document without waste, if the portions requiring emphasis are recorded in a color other than black. In contrast, a document otherwise required to be prepared in two colors may be produced in a monochromatic document in significant manner by a monochromatic recording system if the otherwise colored portions are designated by the emphatical modification described above.

Figure 37:
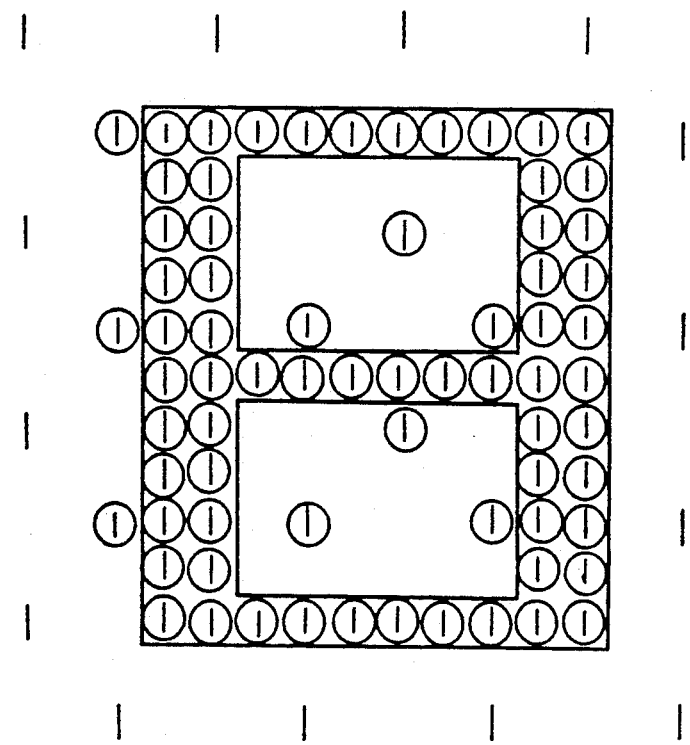
FIG. 37 shows an example of application of still another embodiment of the present invention to color recording.
Figure 38:
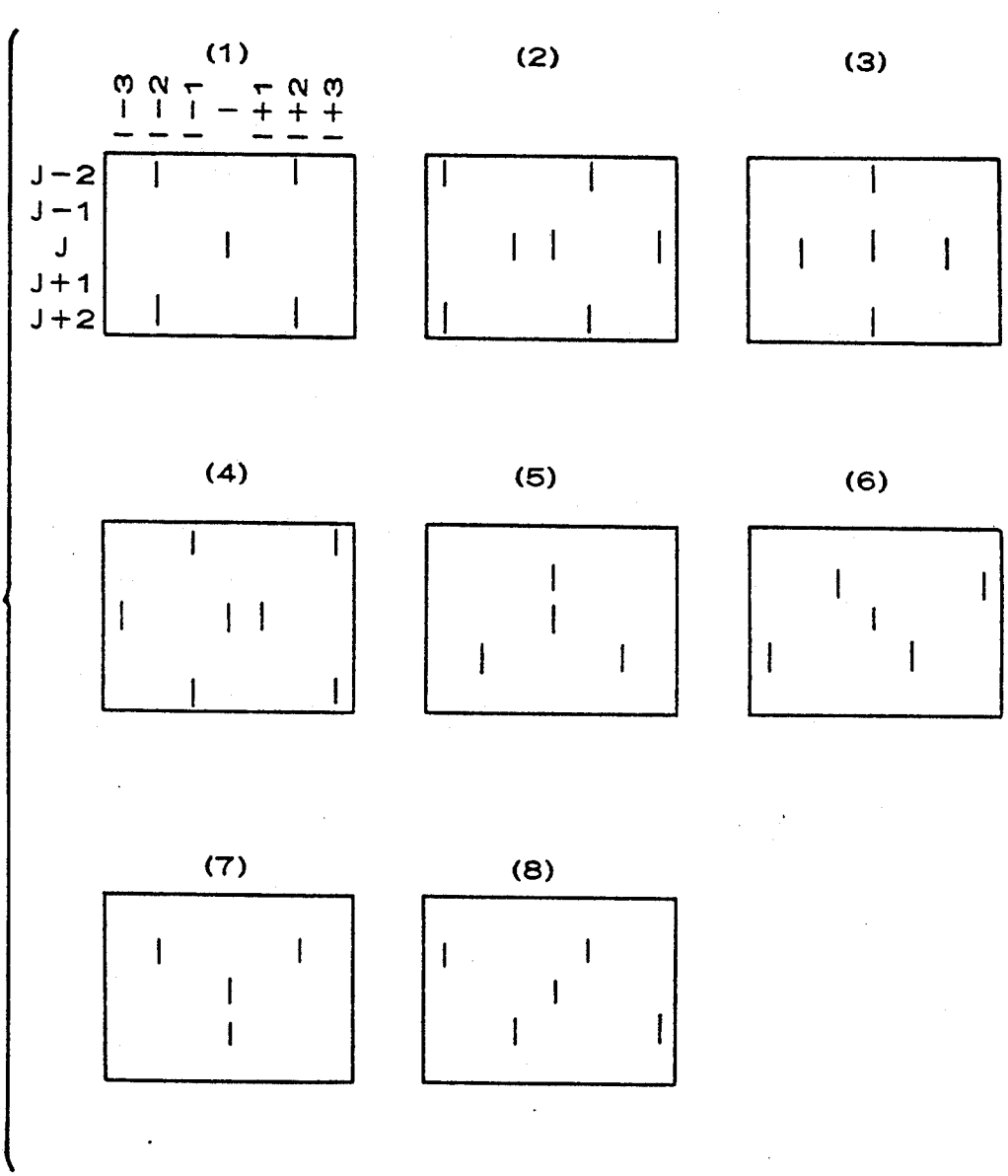
FIG. 38 is a recognition pattern matrix diagram for color recording according to still another embodiment of the present invention.

FIG. 37 shows an example of netting the Japanese kanji character "日" (meaning "the sun" of the rising-sun flag). FIG. 38 shows an example of a related recognition pattern matrix 801. The pattern matrix size according to this embodiment is assumed to be five in column and seven in row. Assuming a condition that any of (1) to (8) in FIG. 38 is represented by the pattern "1" of black pixel and that the spatial pixels of each matrix include at least a number n of white pixels "0", the recording pixel (I, J) is colored for recording in a manner to satisfy the particular condition. The conditional number n is a parameter for avoiding the selection of an image like solid. The present embodiment is shown with the number n of unity. As a result, the netting pattern shown in FIG. 37 is recognized and the black pixels "1" encircled are colored.

In any other emphatical modifications, the aforementioned or other imaging techniques may be used for coloring. Also, in the case where a data in the form of command for each emphatical modification but not as the pixel data 101 mentioned above is applied to the recording system, on the other hand, the process is simplified by interpretation that the particular command data constitutes a coloring instruction without the need of pattern recognition. It is also possible to attain a multi-color recording of two or more colors by applying, for instance, red or the netting pattern shown in FIG. 37 and green for the other netting patterns.

Furthermore, image features other than the emphatical modifications such as a longitudinal or lateral line may be colored. In this way, ruled lines alone may be colored or otherwise various features may be divided by coloring.

As described above, according to the present invention, a monochromatic image is capable of being recorded in multiple colors, thereby remarkably improving the use and application range of a multi-color recording system. In addition, if a multi-color document is prepared by use of monochromatic emphatical modifications, a significant expression is available as a recorded document even as an output of a monochromatic recording system.

The present invention is not limited to the aforementioned embodiments but may include any modifications and improvements thereof. According to these embodiments, the intention of the present invention to realize an ideal image recording with full display of the characteristics of a recording system is of course attained.

According to the present invention, a digital image input data is converted into a continuous or pseudo-continuous analog quantity before recording by laser printer, and therefore the ability of the laser printer is exhibited to a maximum regardless of the characteristics such as the sampling density or the level of quantization of the image input data, thus assuring the recording of a high-quality image.

Another advantage of the present invention is that exposure pattern signals for script, calligraphic styles and other special images are registered separately from each other in an exposure pattern signal storage and therefore the recording of high image quality which could not be obtained simply from an input data is made possible.

Still another advantage of the present invention lies in that an optimum exposure pattern signal is registered for each of a variety of images as related to a particular recording density, so that the highest quality of image is produced for any recording density.

We claim:

1. An optical recording system for recording input pixels by controlling a light quantity with light as a medium based on the input pixels, wherein at least a given one of the input pixels is subdivided into a plurality of subdivision regions and the light quantity is controlled for each subdivision region by comparing information on the pixels surrounding a particular pixel with predetermined pattern information and outputting a respective multi-bit pattern signal for each subdivision region based on a result of the comparison for controlling the light quantity for each subdivision region.

2. An optical recording system according to claim 1, wherein the light quantity is controlled according to environmental conditions.

3. An optical recording system according to claim 1, wherein the light quantity is controlled according to the mechanical characteristics of said system.

4. An optical recording system according to claim 1, wherein the light quantity is controlled according to specifications of a material of a recording medium.

5. An optical recording system according to claim 1, wherein the light quantity is controlled for each plotting region of an image according to layout information of a plotting region.

6. An optical recording system for forming a plurality of pixels resulting from spatial sampling of an image and controlling a light quantity as a medium based on the pixels for recording, comprising means for providing pixel information including a predetermined pattern, means for recognizing at least one feature of the image by comparing the pixel information with at least a given one of the pixels and surrounding pixels, and means for storing a respective multi-bit pattern signal in advance for each of a plurality of pixel subdivision regions for controlling the light quantity in accordance with the at least one feature.

7. An optical recording system according to claim 6, wherein an image is recorded in color in accordance with the at least one feature recognized.

8. An optical recording system according to claim 6, wherein an image is recorded according to the at least one feature recognized.

9. An optical recording system for forming a plurality of pixels resulting from spatial sampling of an image and controlling a light quantity as a medium based on the pixels for recording the image, comprising a light-quantity control device including:

memory means for storing at least some of the pixels;
pattern recognition means for extracting at least a feature of the image and producing an identifier corresponding to the feature based on a relationship between at least one of the pixels stored in the memory means and pixels in a predetermined surrounding range;

an exposure pattern signal storage responsive to the identifier produced by the pattern recognition means and including a control function for determining the light quantity and a control variable of the control function; and drive means for determining the light quantity based on the control function determined by the exposure pattern signal storage and the control variable thereof.

10. An optical recording system for forming a plurality of pixels resulting from spatial sampling of an image and controlling a light quantity as a medium based on the pixels for recording, comprising:

means for recognizing a feature of an image to be recorded based on data on said image;

means for generating an identifier corresponding to the feature;

an exposure pattern signal storage for generating exposure data for exposing a light-sensitive material in accordance with the identifier;

driving means for energizing light source means for generating light in accordance with pixels to be recorded based on the exposure data.

11. An optical recording system according to claim 10, wherein the exposure data generated by the exposure pattern signal storage constitutes arrays of numbers sampled at a frequency higher than a sampling frequency of the pixels.

12. An optical recording system according to claim 10, wherein the exposure data generated by the exposure pattern signal storage constitutes a discrete value quantized at a density larger than the number of quantization levels of the pixels.

13. An optical recording system according to claim 10, wherein the exposure pattern signal storage has stored therein exposure data capable of reproducing an analog binary image produced by converting a recording image signal having the recognized feature into an analog value through a low-pass spatial filter and binarizing the analog value.

14. An optical recording system according to claim 10, wherein a separate exposure data is generated for each feature when a plurality of features are extracted.

15. An optical recording system according to claim 10, wherein the exposure pattern signal storage has stored therein exposure data for producing a desired recording density designated by the identifier and is adapted to be searched with the recording density as an index address.

16. An optical recording system according to claim 15, wherein a pulse width of the exposure data is changed when a whole surface of the image is a uniform black.

17. An optical recording system according to claim 15, wherein a case where the image is a longitudinal thin line or a lateral thin line, a pulse width of the exposure data is changed, and at a same time the pulse width of the exposure data is further changed in such a manner as to expose an interior of a pixel for the longitudinal thin line while a pulse magnitude of the exposure data is changed in such a manner as to expose an interior of a pixel for the lateral thin line.

18. An optical recording system according to claim 10, wherein a developer carried on the light-sensitive material has a plurality of colors, and the exposure data generated by the exposure pattern signal storage includes data corresponding to each of a plurality of selected exposure and development processes.

19. An optical recording system according to claim 10, wherein a sampling frequency of the pixel is different from that of the recording pixels.

20. An optical recording system, comprising:

a light-sensitive drum;

charging means for charging the light-sensitive drum to a uniform potential;

light source means for irradiating the charged light-sensitive drum with light to form an electrostatic latent image on the light-sensitive drum;

developing means for causing the electrostatic latent image on the light-sensitive drum to adsorb a developer to form a visible image;

transferring means for transferring the developer adsorbed by the electrostatic latent image to a recording medium;

fixing means for fixing the transferred developer on the recording medium;

erasing means for erasing a residual charge on the light-sensitive drum; and cleaning means for cleaning residual developer on the light-sensitive drum;

wherein the light source means controls a quantity of light irradiated to the charged light-sensitive drum based on input pixels, and wherein at least one of the input pixels is subdivided into a plurality of subdivision regions and the quantity of light is controlled for each subdivision region by comparing pixel information for pixels surrounding the at least one of the pixels with predetermined pattern information and outputting a respective multi-bit pattern signal for each subdivision region based on a result of the comparison for controlling the quantity of light for each subdivision region.

* * * * *